(12) United States Patent
Calmer et al.

(10) Patent No.: US 12,349,632 B2
(45) Date of Patent: Jul. 8, 2025

(54) THRESHING AND SEPARATION METHOD TO SEPARATE GRAINS FROM MATERIAL OTHER THAN GRAIN VIA THRESHING AND SEPARATING APPARATUSES

(71) Applicant: CALMER HOLDING COMPANY, LLC, Lynn Center, IL (US)

(72) Inventors: Marion Calmer, Alpha, IL (US); Daniel Wallerstedt, Rio, IL (US)

(73) Assignee: CALMER HOLDING COMPANY, LLC, Lynn Center, IL (US)

( * ) Notice: Subject to any disclaimer, the term of this patent is extended or adjusted under 35 U.S.C. 154(b) by 0 days.

(21) Appl. No.: 19/012,623

(22) Filed: Jan. 7, 2025

(65) Prior Publication Data

US 2025/0134001 A1    May 1, 2025

Related U.S. Application Data

(63) Continuation of application No. 18/808,925, filed on Aug. 19, 2024, now Pat. No. 12,219,901, which is a
(Continued)

(51) Int. Cl.
*A01F 12/44* (2006.01)
*A01D 41/12* (2006.01)
(Continued)

(52) U.S. Cl.
CPC ............ *A01F 12/446* (2013.01); *A01D 41/12* (2013.01); *A01F 12/184* (2013.01);
(Continued)

(58) Field of Classification Search
CPC .... A01F 12/446; A01F 12/184; A01F 12/442; A01F 12/20; A01F 12/24; A01F 12/26; A01F 12/28; A01D 41/12
See application file for complete search history.

(56) References Cited

U.S. PATENT DOCUMENTS 2,159,664 A    5/1939 Lindgren
2,327,287 A *  8/1943 Paradise ............... A01F 12/182
                                                460/120
(Continued)

FOREIGN PATENT DOCUMENTS

CA    1283831 C    5/1991
CA    2229361 C    5/2005
(Continued)

OTHER PUBLICATIONS

Charles Closz, "Adjustable Sieve", U.S. Pat. No. 925,623, 3 pages, Patented on Jun. 22, 1909.
(Continued)

*Primary Examiner* — Arpad Fabian-Kovacs
(74) *Attorney, Agent, or Firm* — McKee, Voorhees & Sease, PLC

(57) ABSTRACT

A combine for harvesting a harvested material that includes a grain, the combine comprising: a threshing chamber comprising a series of threshing and separating apparatuses, sequentially arranged, comprising at least: (i) a straight bar concave (ii) a first round bar concave, and (iii) a second round bar concave. The size of each of the straight bar throats is smaller than a size of the first openings, and the size of each of the first openings is smaller than the size of each of the second openings.

20 Claims, 34 Drawing Sheets

Related U.S. Application Data continuation of application No. 18/531,420, filed on Dec. 6, 2023, now Pat. No. 12,102,041, which is a continuation of application No. 17/899,240, filed on Aug. 30, 2022, now Pat. No. 11,877,538.

(51) Int. Cl.
*A01F 12/18* (2006.01)
*A01F 12/20* (2006.01)
*A01F 12/24* (2006.01)
*A01F 12/26* (2006.01)
*A01F 12/28* (2006.01)

(52) U.S. Cl.
CPC ............ *A01F 12/442* (2013.01); *A01F 12/20* (2013.01); *A01F 12/24* (2013.01); *A01F 12/26* (2013.01); *A01F 12/28* (2013.01)

(56) References Cited

U.S. PATENT DOCUMENTS

| | | | |
|---|---|---|---|
| 2,457,259 A | 12/1948 | Moll | |
| 2,554,416 A | 5/1951 | Morrissey | |
| 2,577,329 A | 12/1951 | Irvine | |
| 2,686,523 A | 8/1954 | Young | |
| 3,472,378 A | 10/1969 | Payne | |
| 3,568,682 A | 3/1971 | Knapp et al. | |
| 3,581,746 A | 6/1971 | Louks | |
| 4,003,384 A | 1/1977 | Komancheck et al. | |
| 4,004,404 A | 1/1977 | Rowland-Hill et al. | |
| 4,075,823 A | 2/1978 | Rowland-Hill | |
| 4,192,322 A | 3/1980 | Wilson | |
| 4,259,829 A | 4/1981 | Strubbe | |
| 4,355,647 A | 10/1982 | Heidjann et al. | |
| 4,383,652 A | 5/1983 | Osborne | |
| 4,466,231 A | 8/1984 | Rowland-Hill et al. | |
| 4,502,493 A | 3/1985 | Jones et al. | |
| 4,512,146 A | 4/1985 | Klinner | |
| 4,600,019 A | 7/1986 | McBroom | |
| 4,712,568 A | 12/1987 | Strong et al. | |
| 4,736,753 A | 4/1988 | Glaubitz et al. | |
| 4,770,190 A | 9/1988 | Barnett | |
| 4,796,645 A | 1/1989 | Kuchar | |
| 4,897,071 A | 1/1990 | Desnijder et al. | |
| 4,897,072 A | 1/1990 | Bestland | |
| 4,917,652 A | 4/1990 | Glaubitz et al. | |
| 4,964,838 A | 10/1990 | Cromheecke et al. | |
| 5,338,257 A | 8/1994 | Underwood | |
| 5,489,029 A | 2/1996 | Jonckheere et al. | |
| 5,489,239 A | 2/1996 | Matousek et al. | |
| 5,527,219 A | 6/1996 | Schumacher et al. | |
| 5,569,080 A | 10/1996 | Estes | |
| 5,984,777 A | 11/1999 | Kuchar | |
| 6,117,006 A | 9/2000 | Hofer | |
| 6,119,442 A | 9/2000 | Hale | |
| 6,193,604 B1 | 2/2001 | Ramp et al. | |
| 6,264,553 B1 | 7/2001 | Neumann et al. | |
| 6,358,142 B1 | 3/2002 | Imel et al. | |
| 6,468,154 B1 | 10/2002 | Eggenhaus et al. | |
| 6,485,364 B1 | 11/2002 | Gryspeerdt et al. | |
| 6,530,833 B2 | 3/2003 | Imel et al. | |
| 6,761,630 B1 | 7/2004 | Schwinn et al. | |
| 6,843,719 B1 | 1/2005 | Sacquitne | |
| 7,029,392 B2 | 4/2006 | Jonckheere et al. | |
| 7,166,026 B2 * | 1/2007 | Ricketts ............... | A01F 12/26 460/80 |
| 7,371,162 B2 | 5/2008 | Matousek et al. | |
| 7,393,274 B2 | 7/2008 | Voss et al. | |
| D624,939 S | 10/2010 | Flickinger et al. | |
| 7,946,908 B2 | 5/2011 | Lobdell et al. | |
| 7,997,967 B2 | 8/2011 | Ricketts et al. | |
| 8,133,100 B2 | 3/2012 | Regier et al. | |
| 8,142,266 B2 | 3/2012 | Imbert et al. | |
| 8,282,453 B1 | 10/2012 | Hillen et al. | |
| 8,313,361 B2 | 11/2012 | Flickinger et al. | |
| 8,454,416 B1 | 6/2013 | Estes | |
| 8,469,784 B1 | 6/2013 | Hoskinson et al. | |
| 8,628,390 B2 | 1/2014 | Baltz et al. | |
| 8,636,569 B1 | 1/2014 | Flickinger et al. | |
| 8,721,411 B2 | 5/2014 | Reiger et al. | |
| D735,772 S | 8/2015 | Ricketts et al. | |
| 9,119,349 B2 * | 9/2015 | Ricketts ............... | A01F 12/26 |
| 9,504,204 B2 | 11/2016 | Kile | |
| 9,629,308 B2 | 4/2017 | Scholer et al. | |
| 9,699,971 B2 | 7/2017 | Schuerman et al. | |
| 9,723,791 B1 | 8/2017 | Kile | |
| 9,820,442 B2 | 11/2017 | Matousek et al. | |
| 10,045,487 B1 | 8/2018 | Robertson | |
| 10,111,386 B2 | 10/2018 | Farley et al. | |
| 10,143,135 B2 | 12/2018 | Xu et al. | |
| 10,238,040 B2 | 3/2019 | Meschke et al. | |
| 10,318,138 B2 | 6/2019 | Scholer et al. | |
| 10,375,890 B2 | 8/2019 | Ramp | |
| 10,405,494 B2 | 9/2019 | Regier | |
| 10,412,895 B2 | 9/2019 | Theisen et al. | |
| 10,440,893 B2 | 10/2019 | Kile | |
| 10,609,867 B1 | 4/2020 | Kile | |
| 10,779,474 B2 | 9/2020 | Ritter | |
| D901,546 S | 11/2020 | Robertson | |
| 10,827,682 B2 | 11/2020 | Andrios | |
| 10,827,683 B2 | 11/2020 | Duquesne et al. | |
| 10,849,275 B2 | 12/2020 | Estes | |
| 10,856,469 B2 | 12/2020 | Mammen et al. | |
| 10,869,427 B2 | 12/2020 | Robertson | |
| 10,905,050 B2 | 2/2021 | Robertson | |
| 10,959,380 B2 | 3/2021 | Murray et al. | |
| 11,013,180 B2 | 5/2021 | Narayanan et al. | |
| 11,039,573 B2 | 6/2021 | Xu et al. | |
| 11,116,136 B2 | 9/2021 | Robertson | |
| 11,122,743 B2 | 9/2021 | Robertson | |
| 11,317,566 B2 | 5/2022 | Koudela | |
| D954,759 S | 6/2022 | Robertson | |
| 11,497,171 B2 | 11/2022 | Theisen et al. | |
| D990,525 S | 6/2023 | Robertson | |
| D1,032,666 S | 6/2024 | Calmer | |
| 11,997,952 B2 | 6/2024 | Robertson | |
| 2002/0174636 A1 | 11/2002 | Calmer | |
| 2006/0019731 A1 | 1/2006 | Ricketts et al. | |
| 2007/0178951 A1 | 8/2007 | Voss et al. | |
| 2008/0004092 A1 | 1/2008 | Nelson et al. | |
| 2012/0244921 A1 | 9/2012 | Reiger et al. | |
| 2014/0073380 A1 | 3/2014 | Ricketts et al. | |
| 2014/0128133 A1 | 5/2014 | Claerhout | |
| 2014/0171164 A1 | 6/2014 | Foster et al. | |
| 2015/0250101 A1 | 9/2015 | Kile | |
| 2017/0164559 A1 | 6/2017 | Matousek et al. | |
| 2017/0339832 A1 | 11/2017 | Matousek et al. | |
| 2018/0084728 A1 | 3/2018 | Reiger | |
| 2018/0103588 A1 | 4/2018 | Ritter | |
| 2018/0359926 A1 | 12/2018 | Estes | |
| 2018/0368324 A1 | 12/2018 | Lauer | |
| 2018/0368325 A1 | 12/2018 | Koudela | |
| 2019/0159403 A1 | 5/2019 | Haar et al. | |
| 2019/0166766 A1 | 6/2019 | Robertson | |
| 2019/0166767 A1 | 6/2019 | Robertson | |
| 2019/0387681 A1 | 12/2019 | Theisen et al. | |
| 2021/0105946 A1 | 4/2021 | Robertson | |
| 2021/0127583 A1 | 5/2021 | Isaac et al. | |
| 2021/0169003 A1 | 6/2021 | Ceglinski et al. | |
| 2024/0147912 A1 | 5/2024 | Kile | |

FOREIGN PATENT DOCUMENTS

| | | |
|---|---|---|
| CN | 201174895 Y | 1/2009 |
| CN | 201349422 Y | 11/2009 |
| CN | 201349423 Y | 11/2009 |
| CN | 1017483812 A | 6/2010 |
| CN | 202232225 U | 5/2012 |
| CN | 203015491 U | 6/2013 |
| CN | 203661659 U | 6/2014 |
| CN | 203827748 U | 9/2014 |
| CN | 205510973 U | 8/2016 |
| CN | 103688684 B | 1/2017 |
| CN | 106376296 A | 2/2017 |

(56) References Cited

FOREIGN PATENT DOCUMENTS

| | | |
|---|---|---|
| CN | 205961838 U | 2/2017 |
| CN | 106612996 A | 5/2017 |
| CN | 206196354 U | 5/2017 |
| CN | 206212665 U | 6/2017 |
| CN | 206323790 U | 7/2017 |
| CN | 206323823 U | 7/2017 |
| CN | 107135748 A | 9/2017 |
| CN | 206452758 U | 9/2017 |
| CN | 108029351 A | 5/2018 |
| CN | 207653035 U | 7/2018 |
| CN | 108651016 A | 10/2018 |
| CN | 105325132 B | 1/2019 |
| CN | 105432257 B | 3/2019 |
| CN | 208643319 U | 3/2019 |
| CN | 109588121 A | 4/2019 |
| CN | 109874512 A | 6/2019 |
| CN | 109983927 A | 7/2019 |
| CN | 110199690 A | 9/2019 |
| CN | 110238050 A | 9/2019 |
| CN | 209376250 U | 9/2019 |
| CN | 209732049 U | 12/2019 |
| CN | 209732052 U | 12/2019 |
| CN | 110832994 A | 2/2020 |
| CN | 210352247 U | 4/2020 |
| CN | 210519467 U | 5/2020 |
| CN | 111418357 A | 7/2020 |
| CN | 112119772 A * | 12/2020 ............. A01F 12/10 |
| CN | 212138466 U | 12/2020 |
| CN | 212232175 U | 12/2020 |
| CN | 113016366 A | 6/2021 |
| CN | 113019900 A | 6/2021 |
| CN | 214178128 U | 9/2021 |
| CN | 113455199 A | 10/2021 |
| CN | 214430298 U | 10/2021 |
| CN | 214628240 U | 11/2021 |
| DE | 7145564 U | 1/1973 |
| DE | 3032861 A1 | 5/1982 |
| DE | 3832996 A1 | 4/1989 |
| DE | 3725712 C2 | 5/1989 |
| DE | 10027450 A1 | 1/2002 |
| DE | 102017210710 A1 | 12/2018 |
| DE | 202021104238 U1 | 9/2021 |
| EP | 0248091 B1 | 4/1990 |
| EP | 0323833 B1 | 11/1992 |
| EP | 0459109 B1 | 9/1994 |
| EP | 0682860 A1 | 11/1995 |
| EP | 1348495 B1 | 10/2003 |
| EP | 1068793 B1 | 4/2004 |
| EP | 1862055 B1 | 12/2007 |
| EP | 1474964 B1 | 8/2012 |
| EP | 2550851 B1 | 1/2013 |
| EP | 2796032 B1 | 6/2016 |
| EP | 2752108 B1 | 2/2019 |
| EP | 3571920 B1 | 11/2019 |
| EP | 3818811 A1 | 5/2021 |
| FR | 2328391 A1 | 5/1977 |
| GB | 1572260 A | 7/1980 |
| JP | 3777335 B2 | 3/2006 |
| KR | 101772867 B1 | 8/2017 |
| RU | 2343686 C1 | 1/2009 |
| RU | 2613456 C1 | 3/2017 |
| RU | 198834 U1 | 7/2020 |
| WO | 2014191804 A1 | 12/2014 |
| WO | 2018053897 A1 | 3/2018 |
| WO | 2021222229 A1 | 11/2021 |

OTHER PUBLICATIONS

John Deere, "Operator's Service Manual", Straight-Through Combine, No. 12-A, No. OM-H3-1149, 76 pages. 1952.
"Concave, Front, Small Wire", Abilene Machine, Online Product Listing, 8 pages 2023.
Amadas, "Model AR2200 Advanced Rotary Pull-type Peanut Combine", Man149, 1st Edition, Revision 1, Beg. S/N 570027, 153 pages, Apr. 2019.
Concave for John Deere Combines SH236605, Shoup Parts, Retrieved from the Internet: <URL:www.shoupparts.com/SH236605-Concave>, 4 pages, Apr. 26, 2022.
John Deere, Product Catalog, www.JohnDeere.com, 128 pages, Spring 2021.
International Search Report and Written Opinion in PCT/US2022/075679,, 25 pages, mailed May 3, 2023.

* cited by examiner

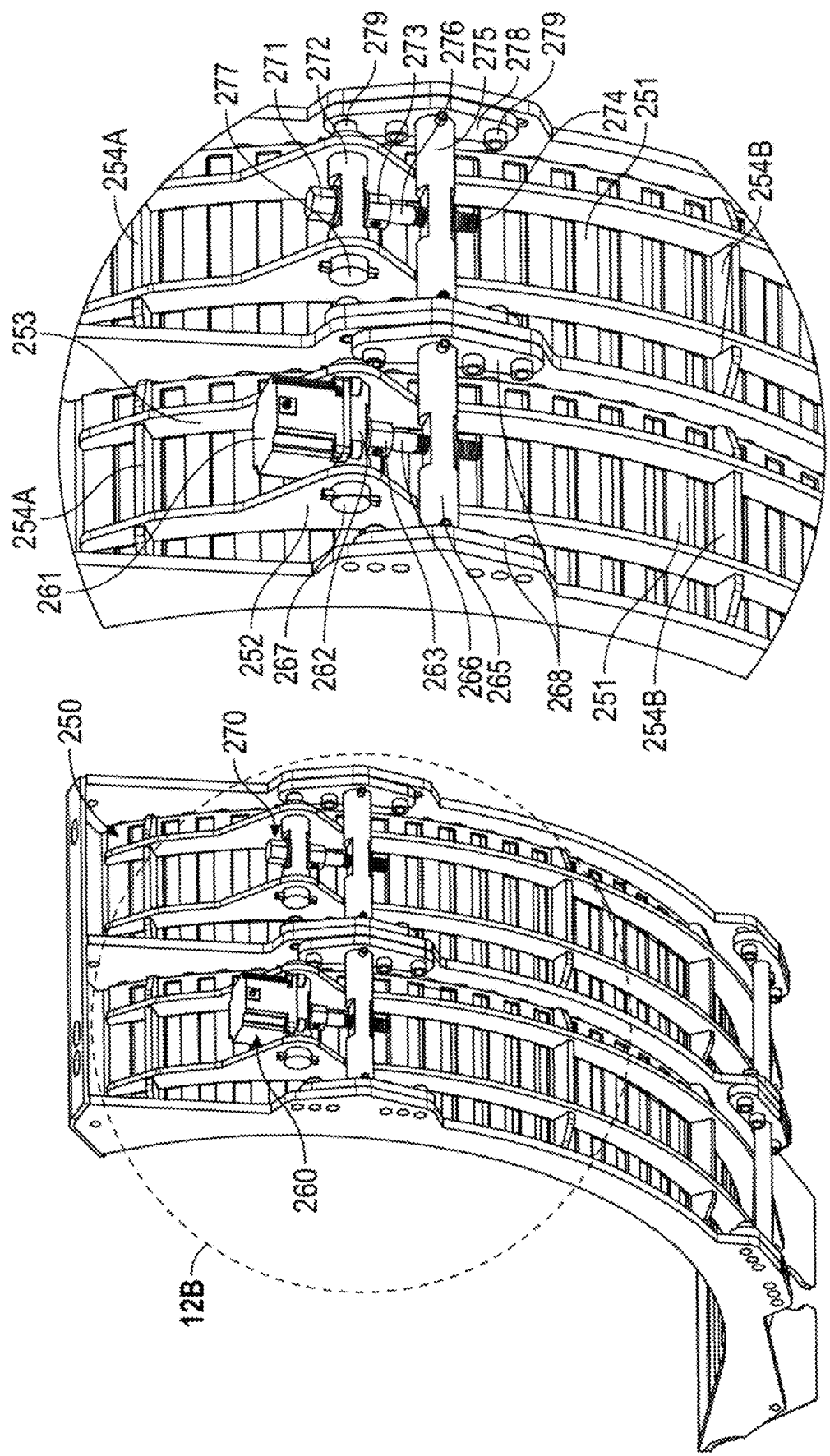

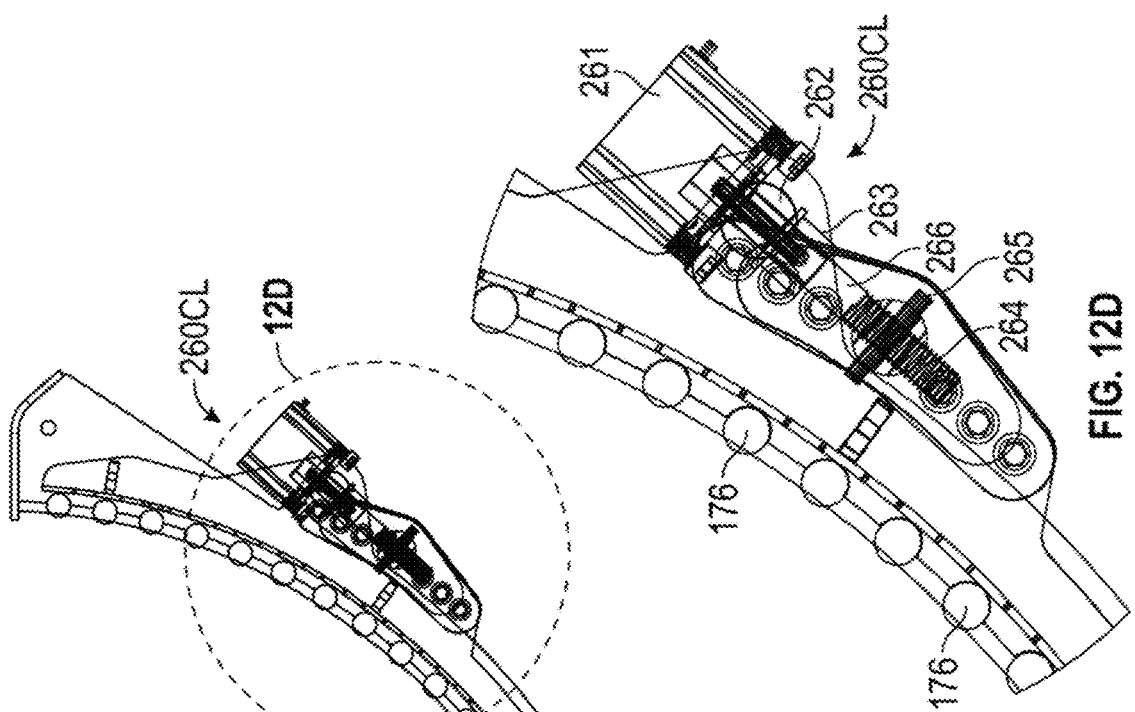
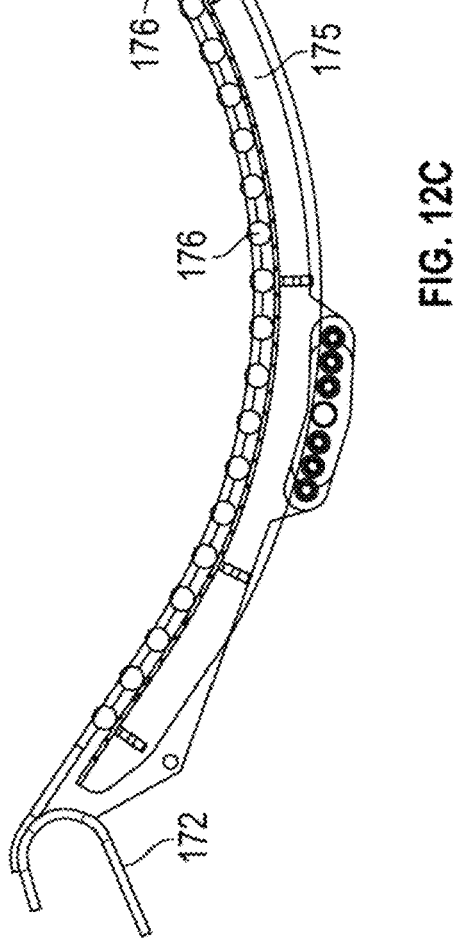

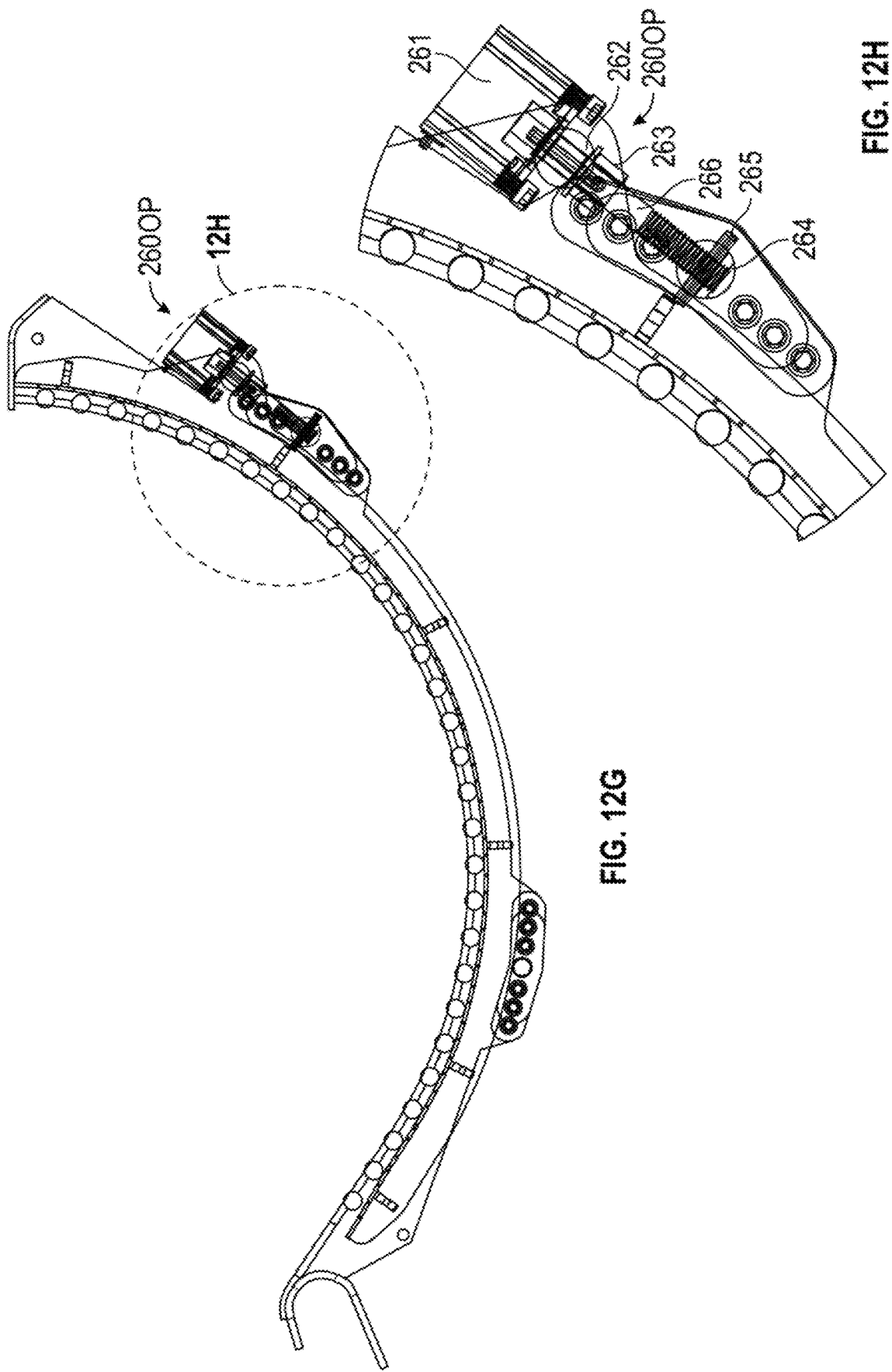

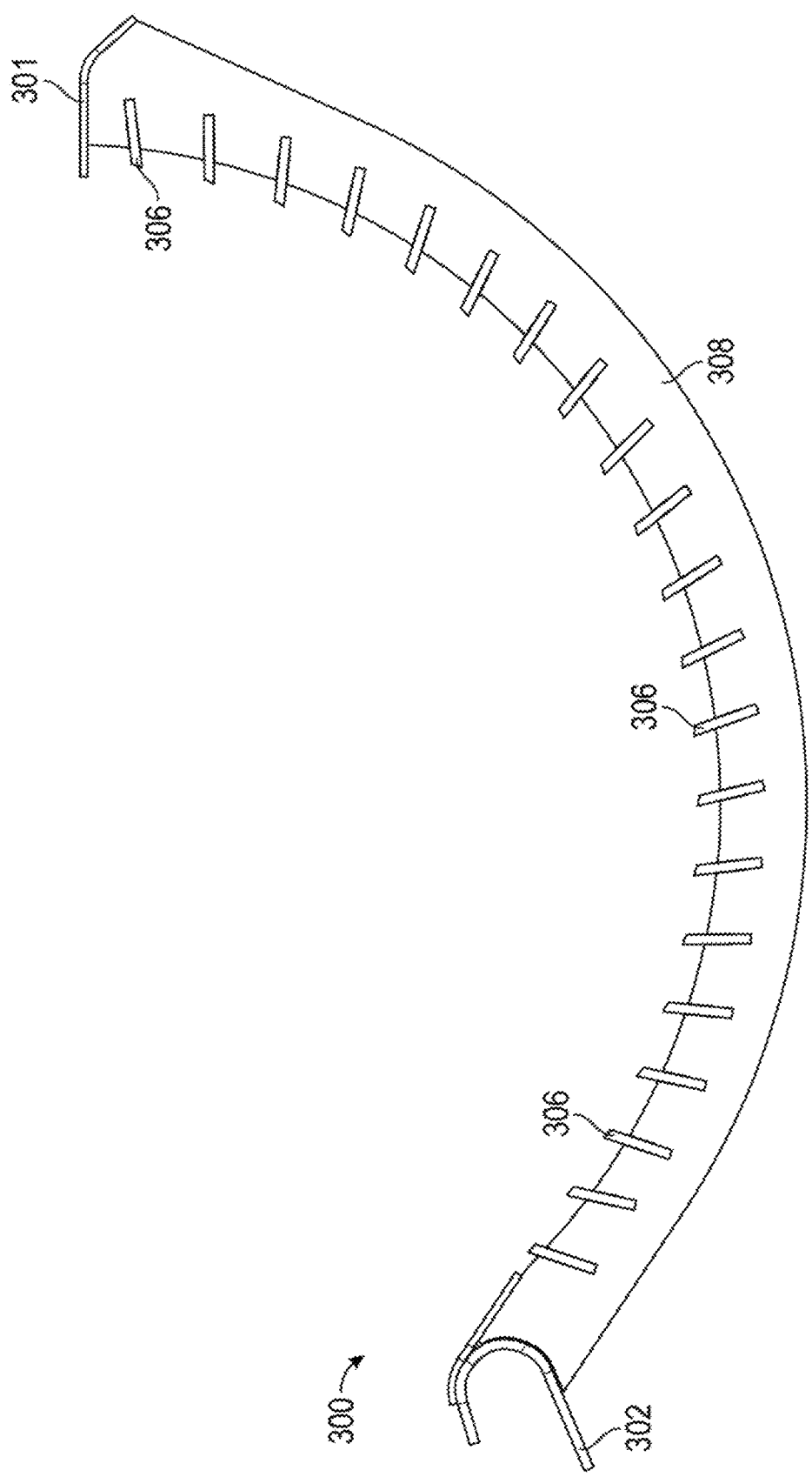

THRESHING AND SEPARATION METHOD TO SEPARATE GRAINS FROM MATERIAL OTHER THAN GRAIN VIA THRESHING AND SEPARATING APPARATUSES

CROSS REFERENCE TO RELATED APPLICATIONS

This is a continuation patent application which claims priority under 35 U.S.C. § 120 to U.S. Ser. No. 18/808,925, filed Aug. 19, 2024, now U.S. Pat. No. 12,219,901, issued Feb. 11, 2025, which is a continuation patent application of U.S. Ser. No. 18/531,420, filed Dec. 6, 2023, now U.S. Pat. No. 12,102,041, issued Oct. 1, 2024, which is a continuation patent application of U.S. Ser. No. 17/899,240, filed Aug. 30, 2022, now U.S. Pat. No. 11,877,538, issued Jan. 23, 2024. Each of the aforementioned applications are hereby incorporated by reference in their entireties herein, including without limitation: the specification, claims, and abstract, as well as any figures, tables, appendices, or drawings thereof.

TECHNOLOGICAL FIELD

The present invention generally relates to the threshing operation within an agricultural combine, such as to thresh cereal grains (e.g., corn and wheat) and legumes (e.g. soybeans). More particularly, but not exclusively, the present invention relates to a retrofit kits for improving the efficacy of combines.

BACKGROUND

The background description provided herein gives context for the present disclosure. Work of the presently named inventors, as well as aspects of the description that may not otherwise qualify as prior art at the time of filing, are neither expressly nor impliedly admitted as prior art.

Single rotary combines are customary utilized in agricultural harvest operations for both large and small grains. The combine is generally controlled from a cab 1. The rotary combine 10 is mated with a head (or header 4) adapted to the crop to be harvested, such as the corn head 2 that harvests corn 3 shown in FIG. 1A or the header 4 that can be used to harvest small cereal grains and/or pod-based crops 9 shown in FIGS. 1B-1C. The header 4 includes reel arms 5, reel 6, tines 7, and cutter bar 8. The header 4 is a part that cuts the plant usually at or near the ground. The header 4 moves the whole plant into the combine 10. The tines 7 of the reel 6 catch the stems of the crop. Once inside the body of the combine, the crop is thrust against the cutter bar 8, a component that looks something like a comb.

Rice, corn, wheat, sunflower, pulses, oats, rye, barley, sorghum, soybeans, flax, and canola can be harvested using the rotary combine 10.

FIG. 1D depicts some of the common internal components of the rotary combine 10. The harvest operation often involves the cutting or chopping of the plant accomplished in conjunction with the threshing/separation of the seed pod, ear or head which is carried into the interior of the combine. The interior of the combine is comprised of an elongated threshing/separation chamber in which the rotor 12 rotates within the rotor housing 13.

The rotary combine 10 is fitted with feeder house 14. The combine 10 includes a harvesting header (e.g. 2, 4) at the front of the machine that delivers collected crop materials to the front end of a feeder house 14. Such materials are moved upwardly and rearwardly within feeder house 14 by an undershot/slat chain conveying system 16 until reaching a beater 18 that rotates about a transverse axis. Beater 18 feeds the material upwardly and rearwardly to a rotary processing device, in this instance to a rotor 12 having an infeed auger 20 on the front end thereof. The auger 20, in turn, advances the materials axially into the processing system located near the rotor 12 for threshing and separating. In other types of systems, the undershot/slat chain conveying system 16 may deliver the crop directly to a threshing cylinder.

FIG. 2A depicts a rotating drum, known as rotor 12, of the rotary combine 10. The rotor 12 includes a nose 22. In a common configuration, the threshing chamber 24 is formed by a casing 13 wherein a rotor 12 is positioned. The rotor 12 is mechanically rotated in operation, for example, in a counter-clockwise direction as depicted in FIG. 2A. The front part of the chamber 24 is where the harvested material (e.g. earlage) is first introduced. The front part of the chamber 24 has historically been understood to be where grain will be mechanically abraded (threshed) from the pod, ear, or head. The rearward part of the chamber 26A, 26B, 26C, and 26D constituting the separating area is where any remaining grain is removed from the harvested material leaving only material other than grain ("MOG") 49 for ejection from the rotor chamber and the combine. Under the threshing chamber 24, an auger bed assembly 39 is positioned which continuously carries the grain and other material dropping down out of the threshing chamber, onto a grain pan, and back to a chaffer or top sieve then dropping downward onto a cleaning or shoe sieve which further cleans and separates the harvested grain.

As disclosed in U.S. Pat. No. 6,193,604, the bottom of the rotor cage has a series of arched porous structures, called concaves 24A-24C. The threshing area of the chamber 24 normally holds three separate concaves located in positions #1, #2, and #3. With small grains, the role of the concaves 24A-24C has historically been understood to thresh pods or heads by peeling away any exterior covering to expose and free the seeds. With larger grains such as corn, the role of the concaves 24A-24C has historically been understood to husk the ear and to separate kernels therefrom. Concave designs utilize more restricted openings in an effort to prevent MOG 49 from dropping out of the chamber and overloading the cleaning system whereby it can end up in the grain bin reducing the cleanliness of the harvested grain and penalizing the farmer. Previously, these heavy concaves 24 had to be physically removed and replaced with concaves having different designs and concave open area ("COA") to accommodate for different sized grain. Alternatively, the farmer would have to make do. This would force the farmer to absorb the grain loss and/or accept dirty grain and the resultant penalty at the elevator.

The crop materials entering the chamber 24 move axially and helically therethrough during threshing and separating. During such travel the crop materials are threshed and separated as the rotor 12 operates in cooperation with preferably foraminous processing members in the form of threshing concaves 24A-24C and separator grate assemblies 26. The grain escapes downward through throat openings of concaves 24A-24C onto auger bed 20 and through separating grates 26 into cleaning mechanism 28.

A blower (fan) 30 customarily continuously operates to provide an airstream moving plant material out the rear of the chamber 24. For example, fines as well as bulkier plant materials retained in the chamber 24 by concaves 24A-24C and grate assemblies 26 and are impelled out the rear of processing system 12 and ultimately out of the rear of the machine by a beater or chopper. Fan 30 forms part of the cleaning mechanism 28 and provides a stream of air throughout the cleaning region and directed out the rear of the machine so as to carry lighter chaff particles that are smaller than grain away from the grain as it migrates downward toward the bottom of the machine to a clean grain auger 32. Auger 32 delivers the clean grain to an elevator (not shown) that elevates the grain to a storage bin 34 on top of the machine, from which it is ultimately unloaded via an unloading spout 36. A return auger 38 at the bottom of the cleaning region is operable in cooperation with other mechanism to reintroduce partially threshed or unthreshed materials into the chamber 26 for an additional pass through the system.

As shown in FIG. 3, a feeding spacer 40 is shown at the boundary of the concave 24A. The concaves 24A-24C typically include a top frame member 41, a bottom frame member 42, straight vertical bars 43, a left-side frame member 44, a right-side frame member 45, horizontal straight rub bars 46, and wires 48. The vertical and horizontal straight bars 43, 46 form spaces/openings 47 in a cross-like arrangement with the wires 48 running through the interior of each the rectangular spaces 47. The construct of concaves 24A-24C is to limit or otherwise restrict harvested material from dropping through the openings in the concave so as to enhance grain separation from MOG 49.

Concaves 24A-24C which utilize "thin" or "narrow" wires are known to become plugged with MOG 49. FIG. 3 in particular shows the concave plugged with MOG hairpinned over wires, and even a few splintered and fractured cobs lodged in the openings 47. If not remedied, these pieces of husks and fractured cobs will, over time, prevent any grain removal from the chamber 24. As the plugging of the concaves increases on top of the foundation of hair-pinned MOG, so increases the grain retained within the chamber 24. This can operate to increase cob splintering or fracture and, further, result in grain being abraded and ground to fines before having the opportunity to exit.

The increase of plugging, even to the point of outright clogging due to MOG 49, may be exacerbated by adverse weather conditions causing an increased amount of moisture within the field. In such damp situations, the rate at which earlage (i) becomes dense and/or solidifies, (ii) aggregates with other MOG 49 such as mud, and/or (3) wraps around the "narrow" wires within the concaves 24A-24C, increases dramatically.

In an effort to overcome clogging, some have tried to employ the use of round bar concaves. However, these are less efficient, particularly with corn as the ear does not thresh easily as a rounded bar is engaging and interacting with a rounded surface (ear of corn).

To overcome these challenges, operators have tried manually decreasing the rotor clearance to the concave and increasing the rotor speed. However, such efforts are often counterproductive. First, decreasing the rotor concave clearance increases the compressive forces, thus increasing the pounds per square inch acting upon the cob. Second, closing the air gap between rasp bars and concave (concave clearance) also increases the compressive forces acting upon the kernels because of the small openings in the concave operate to retain the kernel in the chamber 24. Third, the faster the rotor spins the higher the damage to the kernel on impact and abrasion. Cobs are caused to splinter into various sizes, some as small as or smaller than a kernel of corn. Splintered pieces of cob pass with the clean grain through the sieve opening and eventually into the grain tank or otherwise contributes to the plugging of concave openings. This all contributes to a domino effect—with increased compressive forces comes ever increasing fracture and loss of grain out the rear of the chamber 24.

In other words, one of the problems of using round bars and wires (large or small) with rounded surfaces is that MOG 49 is allowed to hair pin over these rounded surfaces during the threshing operation. This provides a site for the increased retention of MOG 49, resulting in continued restriction and eventual blockage of the opening passageway.

Concaves 24 and separator grates 26 are not easily changed-out within the combine 10. Extended time and effort is required which results in the loss of precious time of harvesting. Therefore, historically the approach has been to adopt a one size fits all approach in combine harvesting irrespective of the grain type being harvested. This results in compromises whereby yield is lost due to grain exiting the rear of the combine 10 or MOG 49 makes its way to the grain bin damaging the value of the crop for the farmer.

Additionally, known rasp bars 62 are formed with a front steel wall perpendicular to the flow of material being threshed that attach via supports 64 and protrude from the rotor 12, the design of which is problematic. As the rotor turns, the rasp bars 62 contact MOG which accumulates on the front steel wall and continues to increase in size. As threshing continues, the freed kernels become entrapped within valleys located between rasp bar teeth and a buildup of material that accumulating on the front perpendicular steel wall. The problem may be further exacerbated by the following sub-issues: the cobs are below the valley, the rasp bar teeth are able to form walls, and the steel end cap closes off the exit of the valley. Since the congested valleys are filled with shelled kernels, the next ear of corn and kernels cannot enter. This creates excessive horsepower requirements and lost capacity and the fracture or grinding of grain.

Thus, there exists a need in the art for a system which addresses the aforementioned problems and better accommodate the appetites of combines that are growing larger every year and are utilizing increasingly higher flow rates that demand a faster removal of grain from the threshing chamber 24.

SUMMARY

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

According to some aspects of the present disclosure, a kit comprised of component parts collectively and synergistically enhances the grain threshing/separation and removal process during harvest, irrespective of whether the grain is large or small. A unique concave design allows for separated grain to be more readily removed from the threshing chamber nearer the beginning of the threshing process thereby reducing the volume within the chamber and protecting the grain from damage from the continuous forces applied by the rotor assembly within the chamber. The unique concave design may operate in conjunction with open valley rasp bars and adjustable MOG limiting bars to further increase the efficiency and volume of grain removed in an undamaged form while simultaneously reducing material other than grain (MOG) from making its way into the cleaning system and the grain tank.

It is a primary object, feature, and/or advantage of the present invention to improve on or overcome the deficiencies in the art.

It is a further object, feature, and/or advantage of the present invention to expedite and increase the early removal of grain from the threshing chamber. Improving efficacy of the threshing action within a combine can have beneficial spillover effects and/or tangential benefits to other suboperations within the combine. Such suboperations can include but are not limited to: cleaning, separating, and rethreshing. Improvements in efficacy of the combine operation will increase cost effectiveness of same.

It is still yet a further object, feature, and/or advantage of the present invention to increase retention time within the chamber for hard to thresh grain.

It is still yet a further object, feature, and/or advantage of the present invention to balance rotor and sieve loss.

It is still yet a further object, feature, and/or advantage of the present invention to separate grain from the pods or heads at the initial point of contact on the concave in position #1.

It is still yet a further object, feature, and/or advantage of the present invention to collect as much grain as possible early in the sequence of concaves and/or separating grates so as not to overwork any one aspect of the system as a whole. For example, a ratio of grain harvested by collecting threshed and separated grain through the openings in the concaves in positions #1-#3 over the grain harvested by collecting threshed and separated grain through the openings in the separating grates which are positioned thereafter, said ratio being at least 3:1, preferably 4:1, even more preferably 5:1, and most preferably 6:1.

It is still yet a further object, feature, and/or advantage of the present invention to select concaves and separating grates with openings that are sized according to the grain that is expected to pass therethrough. In one such unique configuration, the size of the openings in each of the concaves and/or separating grates have a total open area (OA) that is equal to or less than the total open area (OA) of the concave that precedes it. In other unique configurations, the size of the openings are selected based upon the anticipated size of the material other than grain (MOG) that is expected to be mixed in with the harvested material, rather than being based on a size of the grain itself.

In some embodiments, the operator of the combine can adjust the size of these openings without having to uninstall and install different concaves. For example, switches located in the cab of the combine can control a linear stepper motor that can actuate adjustable MOG limiters from a fully retracted position to a fully deployed position thereby reducing or enhancing the size of the openings in the concave through which grain will pass out of the chamber 24. In further examples, the apparent size of these openings can be limited through use of a cover plate, removable MOG limiting inserts, adjustable MOG limiters, and the like. The apparent size of the openings can be adjusted for any useful purpose, however it should be appreciated that adjusting the apparent size of the openings will be useful for, at least, (i) to account for the species crop to be harvested; (ii) to account for the speed of the harvested material flowing through the threshing and/or separating areas of the combine; (iii) to adjust a direction and/or trajectory of the grain being harvested through said openings (i.e., effecting a change in the difference between the grain channel's physical angle and the expected physical trajectory of the grain); (iv) to selectively allow for more and/or less grain to pass through the concaves due to a difference in the anticipated ratio of grain/MOG to be harvested and the actual grain/MOG being harvested; (v) and to account for a higher and/or lower moisture level within the flow of harvested material; etc.

It is still yet a further object, feature, and/or advantage of the present invention to increase the manual and/or automatic control of the concaves and/or separating grates by providing (i) means for adjusting a vertical clearance between the concaves/separating grates and the rotor; (ii) means for retracting and/or deploying adjustable MOG limiters operably attached to the concaves and/or separating grates, thereby allowing an operator to easily switch concave and/or grate configurations for the harvest of different crops; (iii) means for setting a desired position of actuatable components and another means for measuring an actual position of the actuatable components; and (iv) a means for adjusting one or more aspects in the agricultural implement selected from the group consisting of: (a) rotor speed; (b) fan speed; (c) a position of a top sieve; and (d) a position of a bottom sieve.

It yet a further object, feature, and/or advantage of the present invention to nest a plurality of movable straight bars having a rectangular cross section within a plurality of round bars each having a tail and a rectangular notch on an underside thereof, thereby protecting and/or shielding each straight bar as the straight bar moves in and out of the notch.

It is still yet a further object, feature, and/or advantage of the present invention to utilize improvements disclosed herein with traditional components, including but not limited to components associated with both single and twin rotor combines.

It is still yet a further object, feature, and/or advantage of the present invention to be able to automatically retract cover plates used in connection with separating grates.

The system and kits disclosed herein can be used in a wide variety of applications. For example, beneficial aspects of the present invention can be employed in traditional harvesting operations (e.g., to harvest corn (maize), soybeans, wheat, rye, triticale, rice, oats, barley, sorghum, flax (linseed), sunflowers, rapeseed, grasses, clovers, alfalfa, and field peas).

It is preferred components of the systems and kits described herein be durable enough to withstand prolonged operations. Due to the unique design of the separation bars in the concave, there is less compressive forces applied to the harvested materials which increases the percentage of cobs which remain whole and intact and are not broken into pieces which may easily pass through to the grain tank with the grain. These features allow the rotor speed to be maintained at a lower level and the top sieve to be operated with greater openings, all of which reduce grain losses from the rotor and cleaning sieve areas. It is also preferred the components resist excessive heat, static buildup, corrosion, abrasion, and/or other types of mechanical wear and failure due to cracking, crumbling, shearing, creeping. Ideally, said components are also substantially unaffected by variable crop moisture, thereby providing the ability to operate in a wider variety of adverse weather conditions.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the present invention.

Methods can be practiced which facilitate use, manufacture, assembly, maintenance, and repair of said systems and kits which accomplish some or all of the previously stated objectives.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

FIG. 9A is a front perspective view thereof. FIG. 9B is a bottom perspective view thereof, emphasizing further details of the cover plates themselves.

FIG. 11A is a front perspective view thereof. FIG. 11B shows a detailed rear end perspective view thereof, emphasizing view of the mechanical fastening means for which the MOG limiting insert removably attaches to the concave. FIG. 11C shows an isolated view of the MOG limited insert included within the system of FIG. 8. FIG. 11D shows a front end perspective view of the assembled MOG limiting insert and concave combination.

FIGS. 12A-H shows an alternative assembly with adjustable MOG limiters for the concaves of positions #2 and #3. The MOG limiters are either manually or automatically adjusted while the concaves are in an operating position to open and close the gaps between the round bars. The gaps between the round bars can be those of the standard OEM round bar (e.g., ⅝ inch) or can include wider gaps just as the embodiment of FIG. 10 (e.g., ¾ inch) does. FIGS. 12A-12D show the assembly in an "open" position. FIG. 12A shows a rear perspective view of the assembly in an open position. FIG. 12B shows a detailed view of the remote linear actuator and the manual adjuster in an open position. Either one or both types can be used in a single embodiment to adjust the position of the MOG limiters relative to the concave to expand or limit the size of the gaps between the bars of the concave. FIG. 12C shows a right-side elevation view of the assembly in an open position. FIG. 12D shows a detailed view of the actuators within the assembly in open positions. FIG. 12E shows a rear perspective view of the assembly in a closed position. FIG. 12F shows a detailed view of the remote linear actuator and the manual adjuster in a closed position. Either one or both types can be used in a single embodiment to adjust the position of the MOG limiters relative to the concave to increase or decrease the concave open area (COA). FIG. 12G shows a right-side elevation view of the assembly in a closed position. FIG. 12H shows a detailed view of the actuators within the assembly in closed positions.

FIG. 14A shows the adjustable MOG limiters in a partially deployed position. FIGS. 14B-14D show the assembly in a fully retracted, "hidden" position. FIG. 14B shows a side schematic view of the actuation assembly in the fully retracted position. FIG. 14C shows a first, detailed, and perspective view of the actuation assembly in the fully retracted position. FIG. 14D shows a second, detailed, and perspective view of the actuation assembly in the fully retracted position. FIGS. 14E-14G show the assembly in a fully deployed position. FIG. 14E shows a side schematic view of the actuation assembly in the fully deployed position. FIG. 14F shows a first, detailed, and perspective view of the actuation assembly in the fully deployed position. FIG. 14G shows a second, detailed, and perspective view of the actuation assembly in the fully deployed position.

FIG. 20 shows a concave having horizontal bars angled to match the trajectory of the material to be harvested therethrough.

Figure 1A:
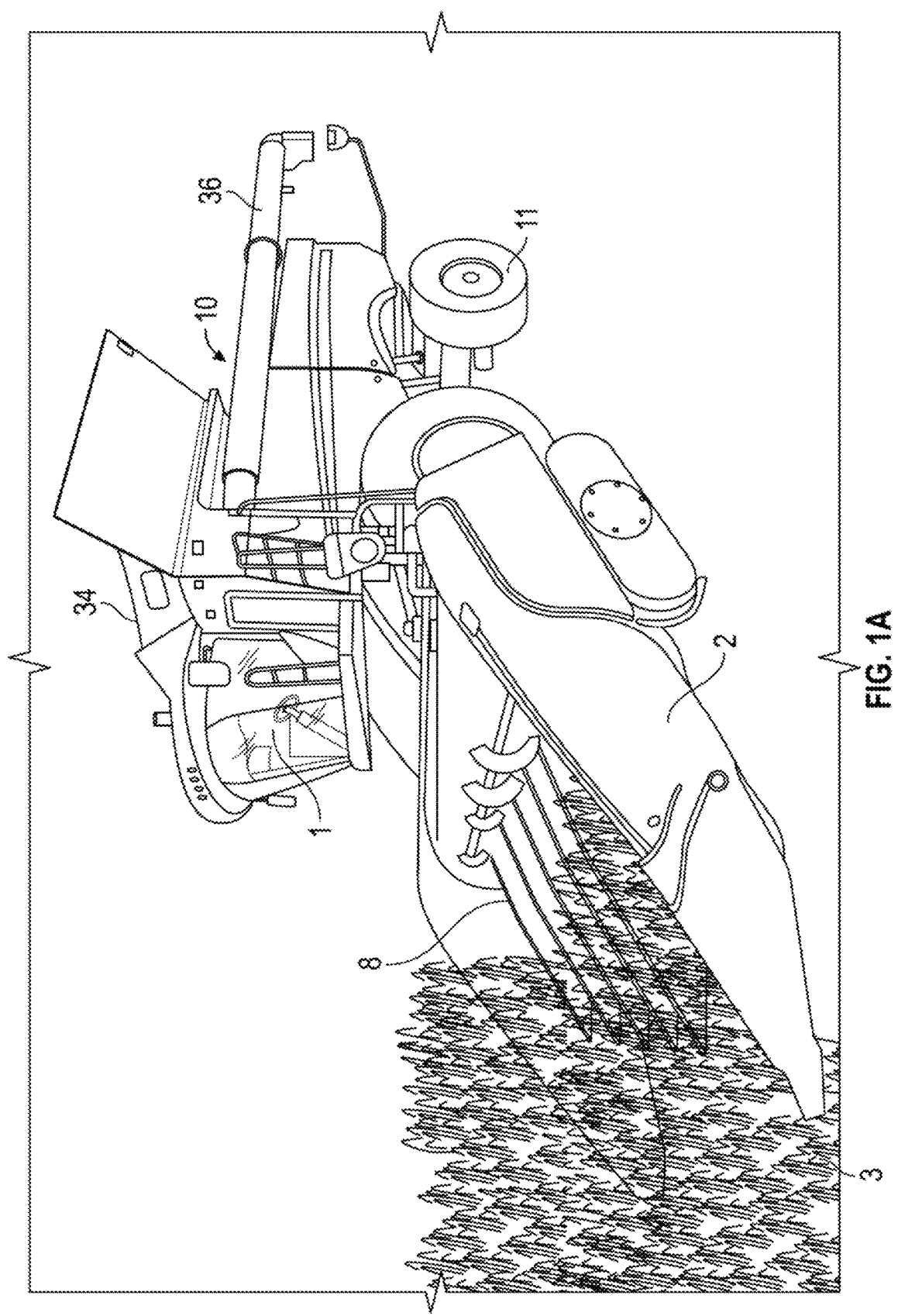
FIG. 1A exemplifies a combine fitted with a corn head harvesting corn.
Figure 1B:
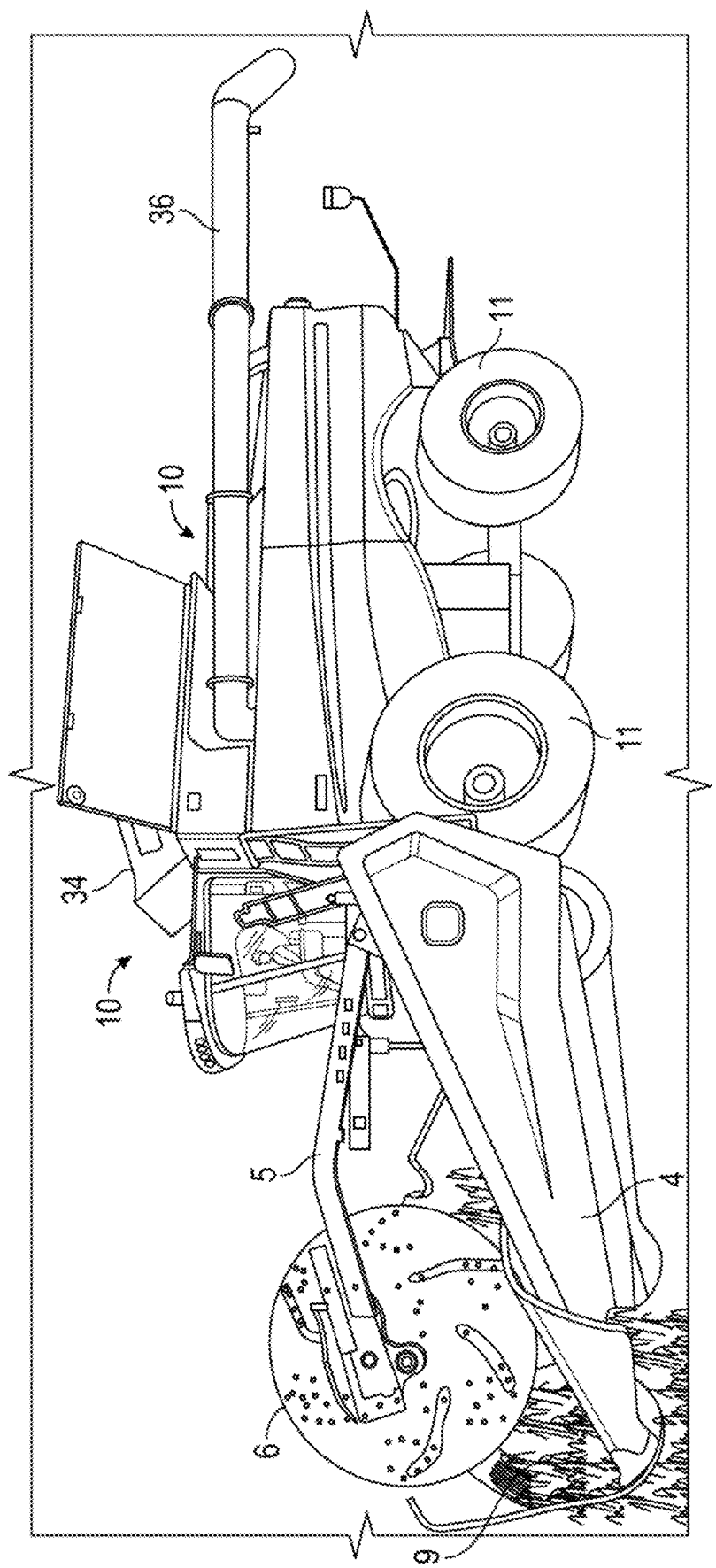
FIG. 1B exemplifies a side elevation view of a combine fitted with a header for soybeans (legumes) and other small grains such as wheat.
Figure 1C:
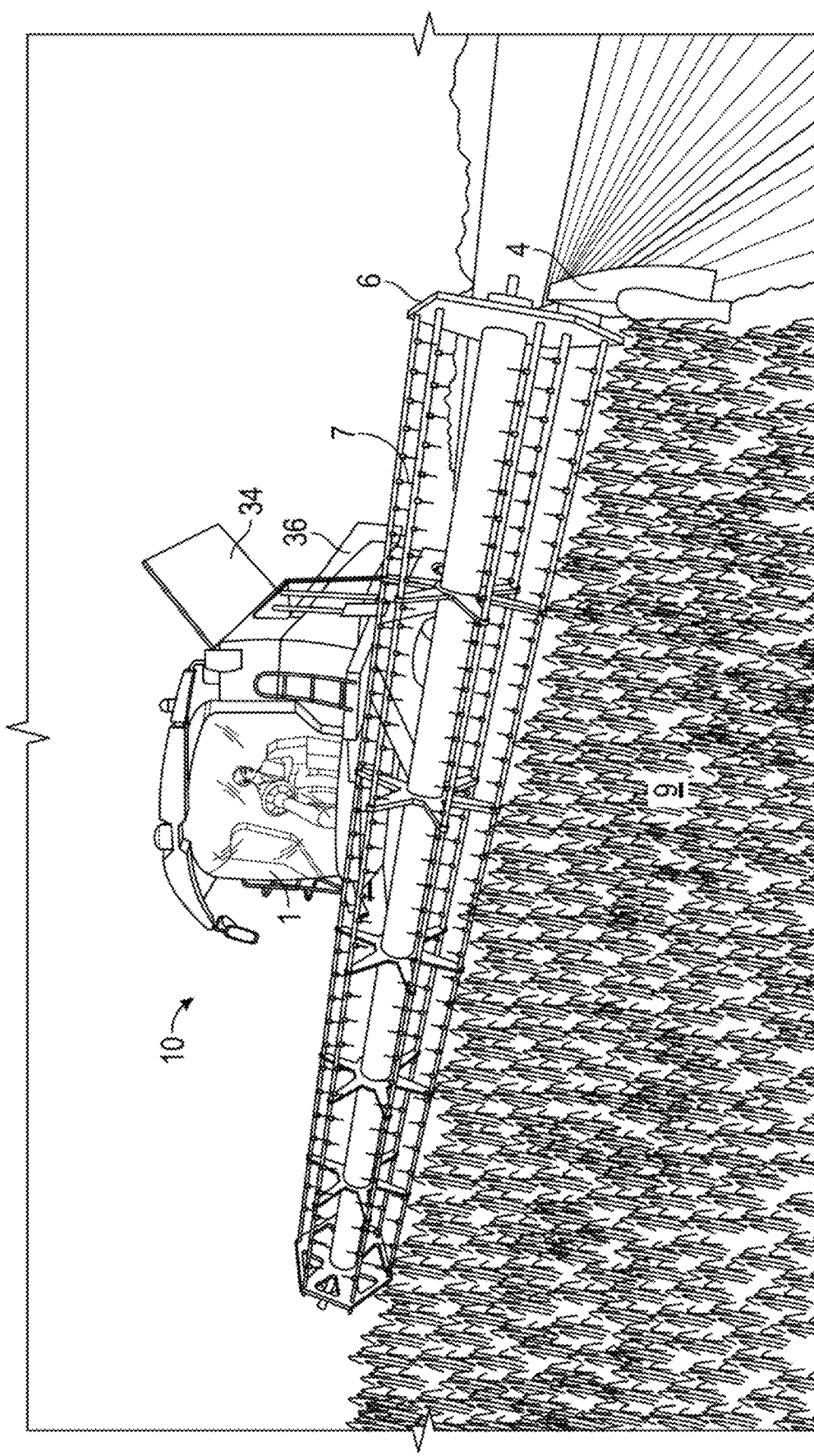
FIG. 1C exemplifies a front perspective view of the combine of FIG. 1B.
Figure 1D:
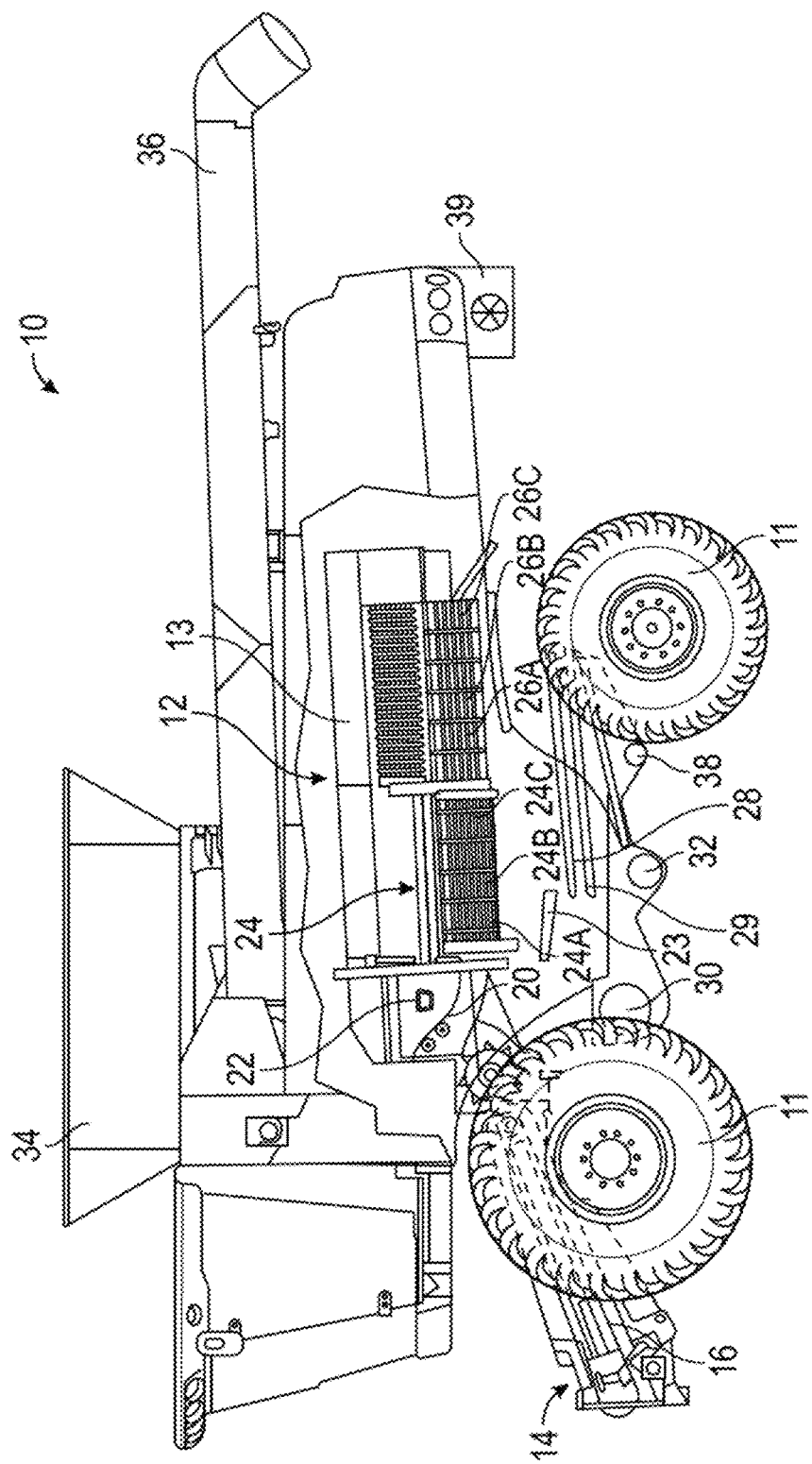
FIG. 1D shows internal components that are common to the combines of FIGS. 1A and 1B-1C.
Figure 2A:
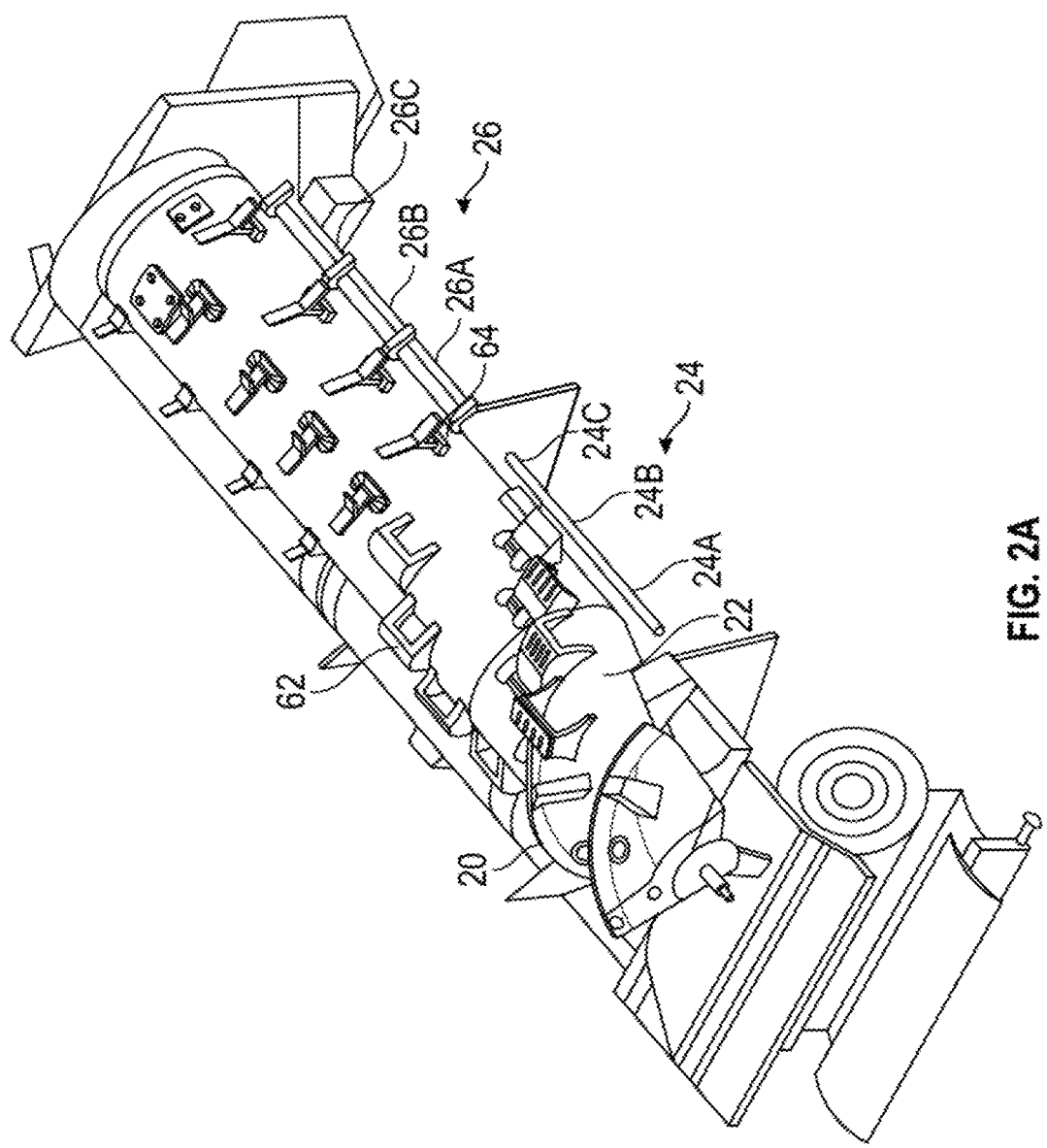
FIG. 2A exemplifies a single rotor combine and the interior of the threshing chamber.
Figure 2B:
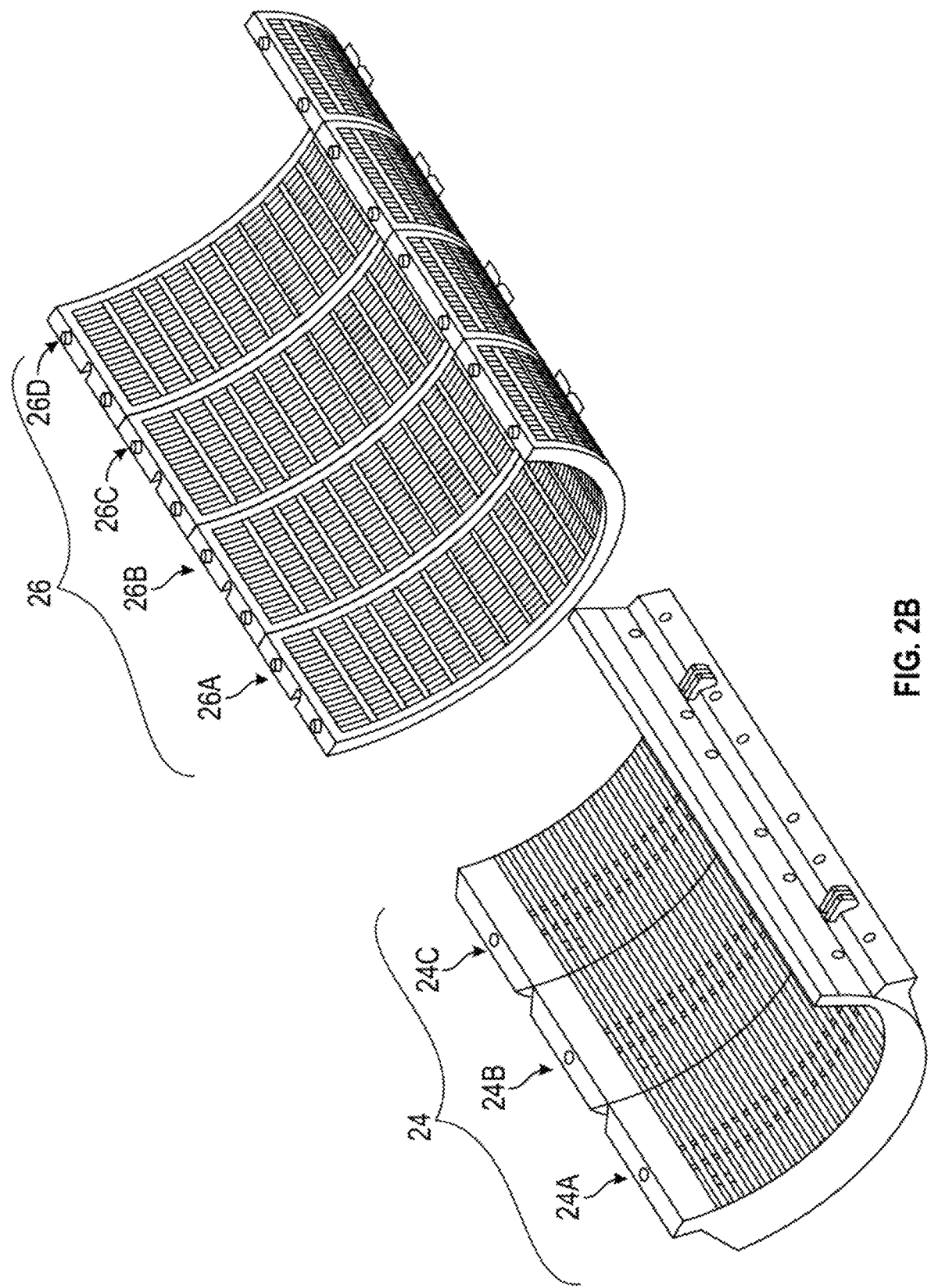
FIG. 2B exemplifies an isolated view of the threshing chamber and the separating area that are installed below the single rotor of FIG. 2A.
Figure 2C:
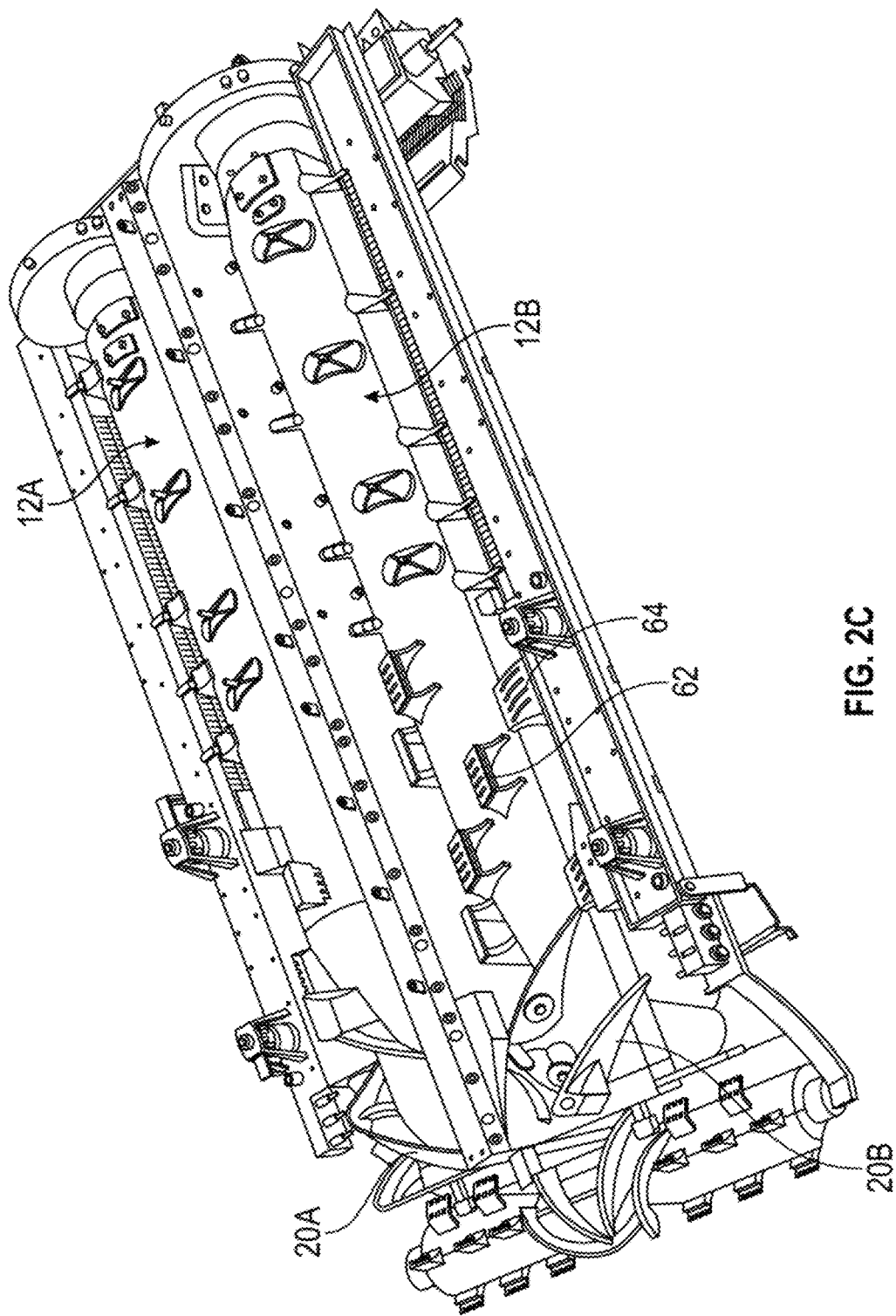
FIG. 2C exemplifies a twin rotor combine and the interior of the threshing chamber.

An artisan of ordinary skill in the art need not view, within isolated figure(s), the near infinite number of distinct permutations of features described in the following detailed description to facilitate an understanding of the present invention.

DETAILED DESCRIPTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

FIGS. 4A-4B and 5-8 depict concaves 50, 140 usable within threshing systems 100A, 100B. Each concave is generally elongated having a curvature which approximates the curvature of the interior rotor of a single rotor combine.

The round bar concave 50 generally has a top frame member 51, a bottom frame member 52, a center bar 53 (also known as a vertical frame member), a left side frame member 54, a right side frame member 55, horizontal round bars 56, side member 58, and attaching means 59. The round bars 56 and frame form openings 57 through which separated grain passes. Some embodiments of the round bar concaves 50 can utilize a series of vertical wires (not shown) passing through the horizontal bars 56 (not shown).

Figure 3:
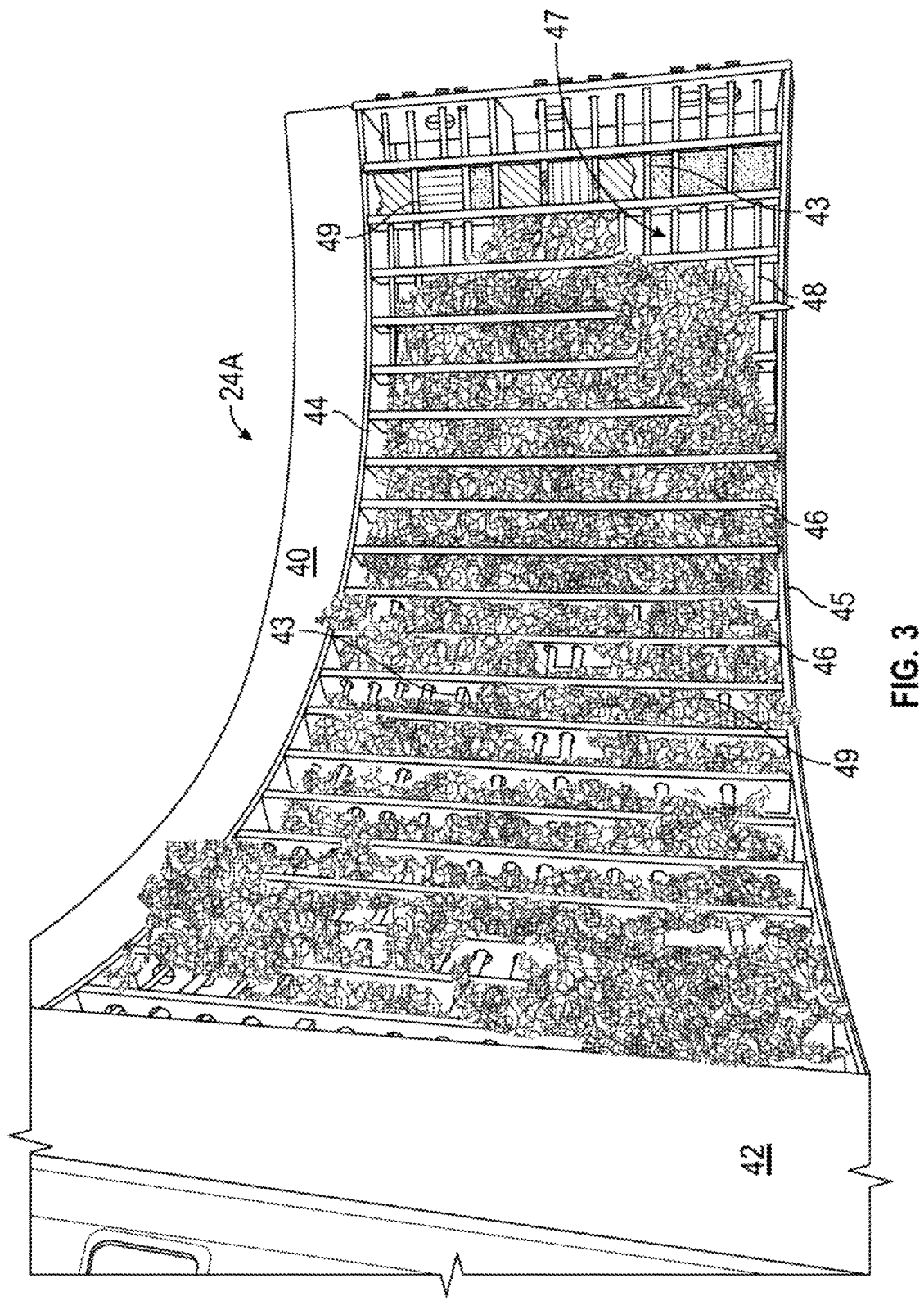
FIG. 3 captures substantial clogging of a narrow wire concave with MOG.
Figure 4B:
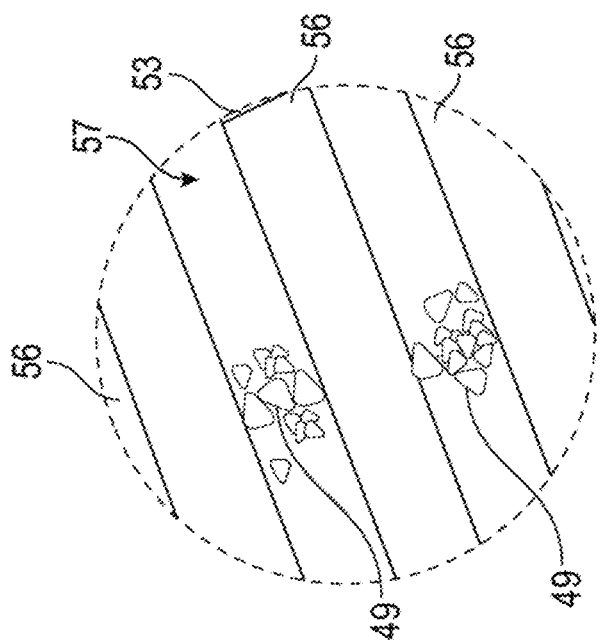
FIG. 4B exemplifies the problem of grains "bridging", which can negatively effect flow of the typical round bar concave of FIG. 4A.
Figure 4A:
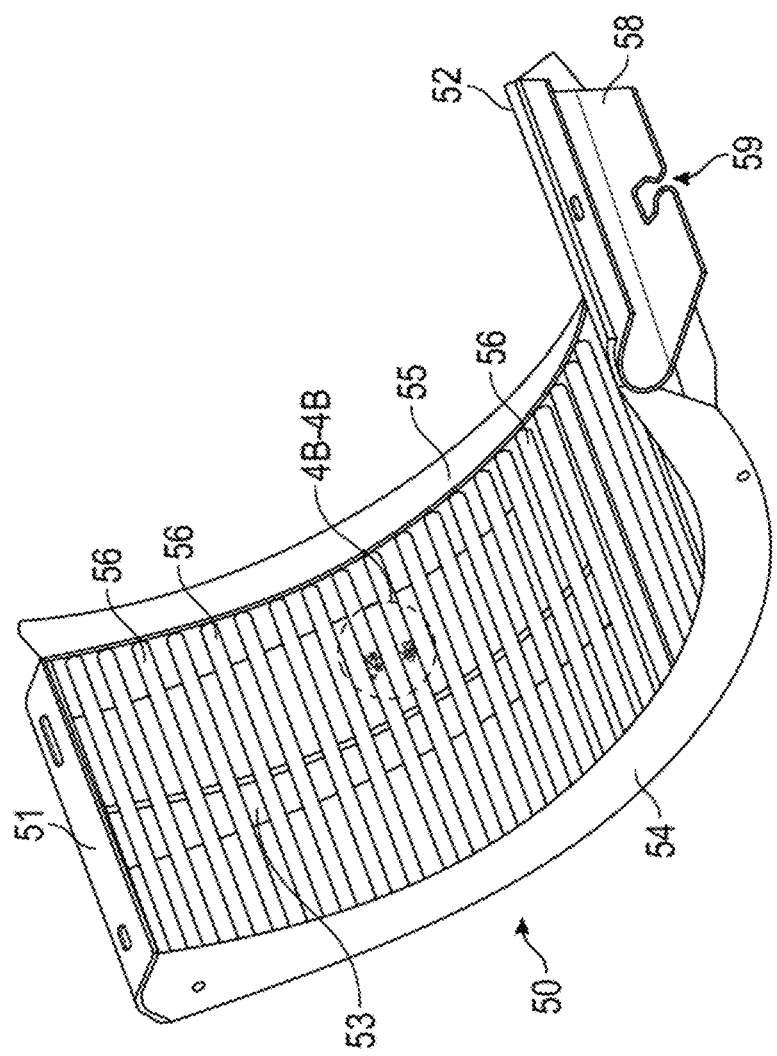
FIG. 4A exemplifies a typical round bar concave.

The round bar concave 50 of FIGS. 4A-4B features round cross bars 56 and is void of wires. The round bar concave 50 of FIG. 4A differs not only from the narrow wire and square edged bars shown in FIGS. 3, but also other designs that incorporate wide, narrow, and helical concaves. The round bar concave 50 is useful in harvesting field corn (even at levels above 25% moisture), soybeans, popcorn, and food corn. The round bar concave 50 may also in harvest of small grains, sorghum, sunflowers, and canola when retrofit with removable MOG limiting inserts 150 or the unique adjustable MOG limiters 250 described herein. The round bar concave 50 preferably occupy one or more positions after position #1 (e.g. positions #2 and #3 within the rotary combine 10.

Figure 5:
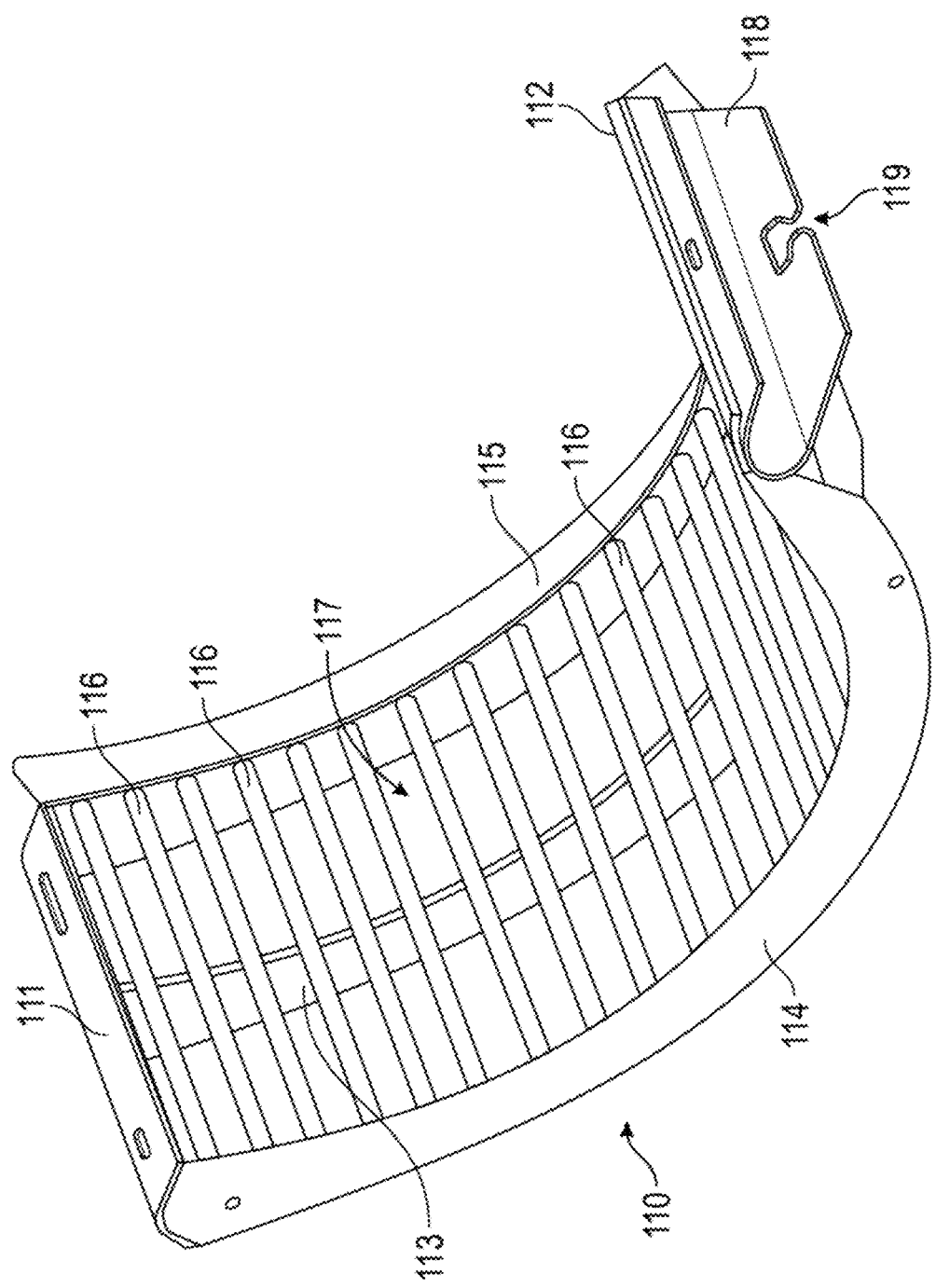
FIG. 5 exemplifies a round bar concave with a slightly modified geometry wherein the round bars are still ⅝" but the gaps have been widened to ¾".

FIG. 5 also features a round bar concave 110 generally has a top frame member 111, a bottom frame member 112, a center bar 113 (also known as a vertical frame member), a left side frame member 114, a right side frame member 115, horizontal round bars 116, side member 118, and attaching means 119. The round bars 56 and frame form openings 117 through which separated grain passes. Some round bar concaves 110 can utilize a series of vertical wires (not shown) passing through the horizontal bars 116. The round bar concave of FIG. 5 however differs from the round bar concave of FIG. 4A in that the gaps are widened from the standard ⅝ inches (FIG. 4A) to a less dense (less compact: wider) ¾ inches (FIG. 5).

Figure 7:
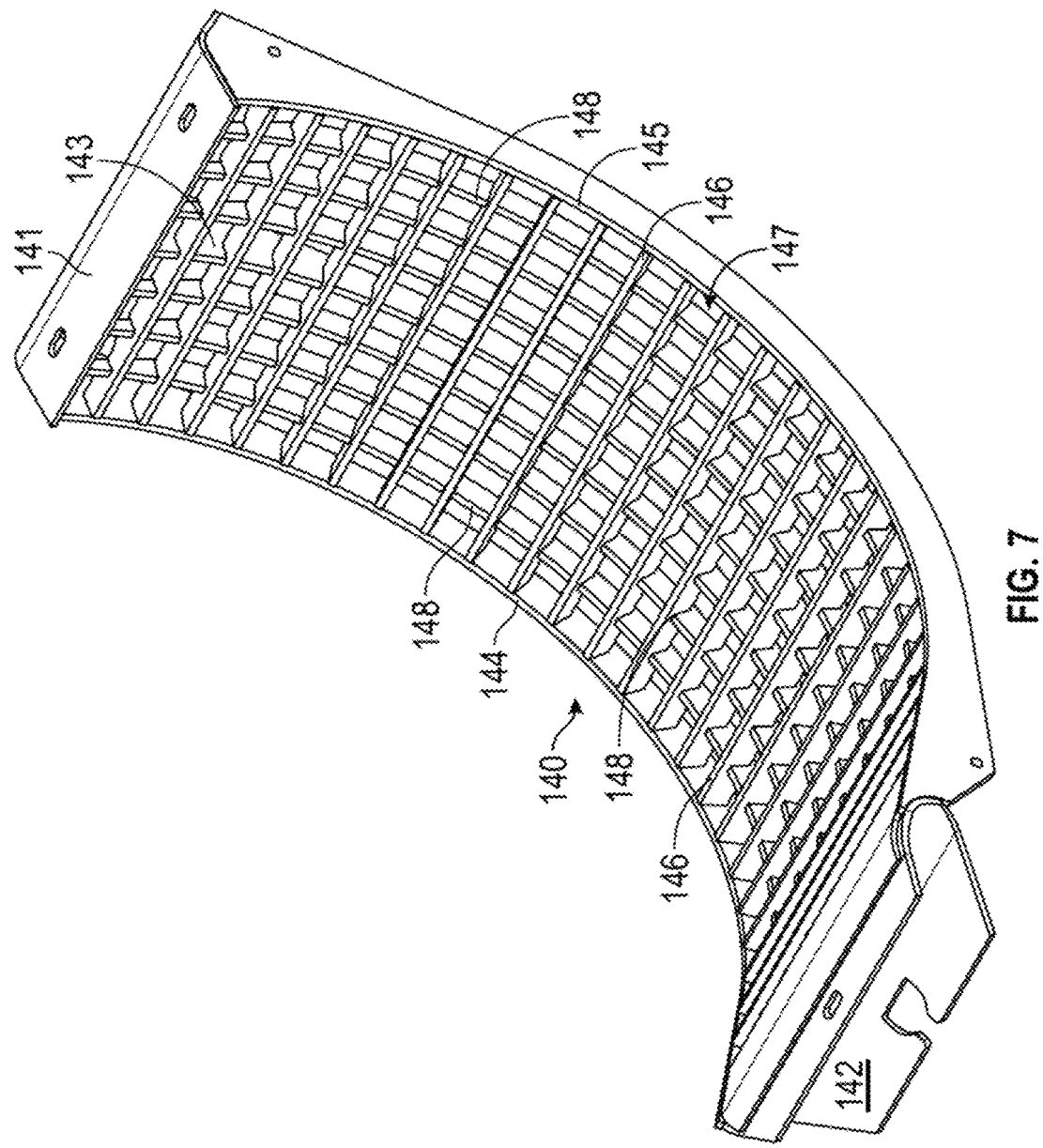
FIG. 7 details a straight bar concave having a modified geometry specially adapted to initiate the separation of grain from the cob, according to some aspects of the present disclosure.

The uniquely designed concave 140 of FIG. 7 utilizes intersecting bars (i.e. 143 and 148) to abrade harvested materials and separate grain. In operation, the harvested ear, head, or pod is mechanically propelled in a direction approximately parallel to the elongated concave. Straight horizontal bars 146 are positioned within the concave to abrade the grain and separate grain from the ear, head, or pod.

Referring again to FIG. 7, the square edged vertical support bars 143 are curved and extend from the top frame member 141 of the concave 140 to the bottom frame member 142 of the concave 140. The curvature of these members, as well as the curvature of the left side frame member 144 and right side frame member 145 are designed to approximate the curvature of the rotor 12.

In some embodiments, all or some of the vertical support bars (e.g., 148) may be oriented at an angle to account for the velocity of the grain separated in threshing. Grains may be of an imprecise or differing geometry in comparison to one another, and striking the vertical support bar oriented at 90° up and down in relation to the positioning of the horizontal rub bar (e.g., 146) may result in the velocity of the grain causing a rebound effect where the grain is deflected upwardly and out of the throat 147 of the concave. To account for this untoward rebound, and to facilitate the expediated passage of the grain through the throat, one or more of the vertical support bars may be angled at greater than 90° so as to present a slightly downwardly facing sidewall which would facilitate the grain striking the sidewall with velocity in being deflected downwardly through the throat.

The walls of the horizontal rub bars 146 are approximately 90° to the square edged vertical support bars 143 of the standard depth and the vertical straight bars of a reduced depth 148. The horizontal rub bars 146 have distinct edges thereby presenting a sharp leading edge which contacts and operates to effectively separate the grain from the ear, head, or pod.

The horizontal rub bars 146 can be positioned in the concave at an angle to perpendicular in relation to the left side frame member 144 and the right-side frame member 145. The angled horizontal rub bars 146 thereby present an angled surface area that is less obstructive to grain. This facilitates increased grain movement through the concave and out of the threshing chamber 24. This action reduces the volume in the chamber to allow for more efficient and faster threshing and, also, operates to protect the grain by preventing its continued churning and grinding within the chamber.

Historically, with concaves utilizing round horizontal bars in the harvest of corn such as found with John Deere's OEM concaves, round bars have limited effectiveness in catching the kernels or soybeans so as to cause separation from the ear, pod, or head. To overcome this disadvantage, the farmer often would decrease the clearance between the rotor and the concave thereby adding compressive pressure to separate the kernels or soybeans. This increased compressive loading had the effect of increasing fracture of the kernel or soybean, or with corn the splintering of the cobs during the threshing operation. These pieces of cob would then pass with the clean grain through the sieve opening and eventually into the grain tank or otherwise may become intertwined with MOG hair-pinned on the round bars to reduce or plug the openings of the concave.

The use of the sharp leading edge on the horizontal rub bars 146 operates to more aggressively separate the kernels from the cob utilizing less compressive forces, thereby reducing the percentage of fractured kernels or soybeans, and with corn thereby preserving whole cobs which are easily separated and passed through the chamber 24 and out the back of the combine 10 with the other MOG 49. A further benefit with the use of reduced compressive forces is the ability to allow the farmer to maintain a larger opening of the top sieve of the combine 10. This increases the removal of grain and reduces the amount of grain lost over the top sieve and out the back of the combine—a condition known as sieve loss.

Vertical bars of reduced depth 148 can be positioned within the throat 147 of the concave positioned with sufficient depth to protect grain seated atop from grinding or cracking action of the rotor or rasps affixed to the rotor.

The vertical square edged intersecting bars 148 can be positioned within the throat 147 of the concave so as to allow for greater openings or voids within the throat 147 thereby increasing the area available to allow the grain to drop through the concave in an unencumbered manner. In one embodiment, the vertical square edged intersecting bars 148 are separated so as to increase the open area by 49% when compared to an OEM concave. The net effect of this increased open area within the concave is to allow for the increased and rapid removal of grain from the chamber.

The crosspieces are not configured as rounded wires, such as in the "thin" or "narrow" wire configurations but are configured as straight rectangular bars 146. The 90° edges of the rectangular bars 146 operate to aggressively sever MOG 149 where rounded configurations allow for the MOG 149 to more easily be hairpinned over the rounded wires, therefore plugging the throat openings as shown in FIG. 3.

The concave 140 and its components can comprise and/or consist completely of hardened steel. Hardened steel can be utilized to form at least the leading edge of the crossbars. Hardened steel facilitates maintaining a sharp edge which enhances the abrasive action of the crossbars. Hardened steel also operates to reduce the wear on the crossbars thereby providing greater useful life for the concaves.

The kits and systems described herein utilize at least two distinct concaves arranged in series to increase the effectiveness of the threshing and grain removal processes within the chamber. The systems 100A and 100B utilize a concave for aggressive kernel separation in the earliest position and all concaves have an increased capacity to harvest a high yielding crop in all moisture levels. The systems 100A and 100B which are adapted to harvest corn and soybeans respectively. The system 100B utilizes the same concaves as 100A, but allows the addition of cover plates and MOG limiters for harvesting soybeans and other small grains. The concaves of systems 100A and 100B can be easily installed as after market and/or as replacement parts. For example, smaller round bar concaves (e.g. concave 170) that decrease the diameter of the round bars can included within the same kit as the straight bar concave having a modified geometry 140.

Figure 6:
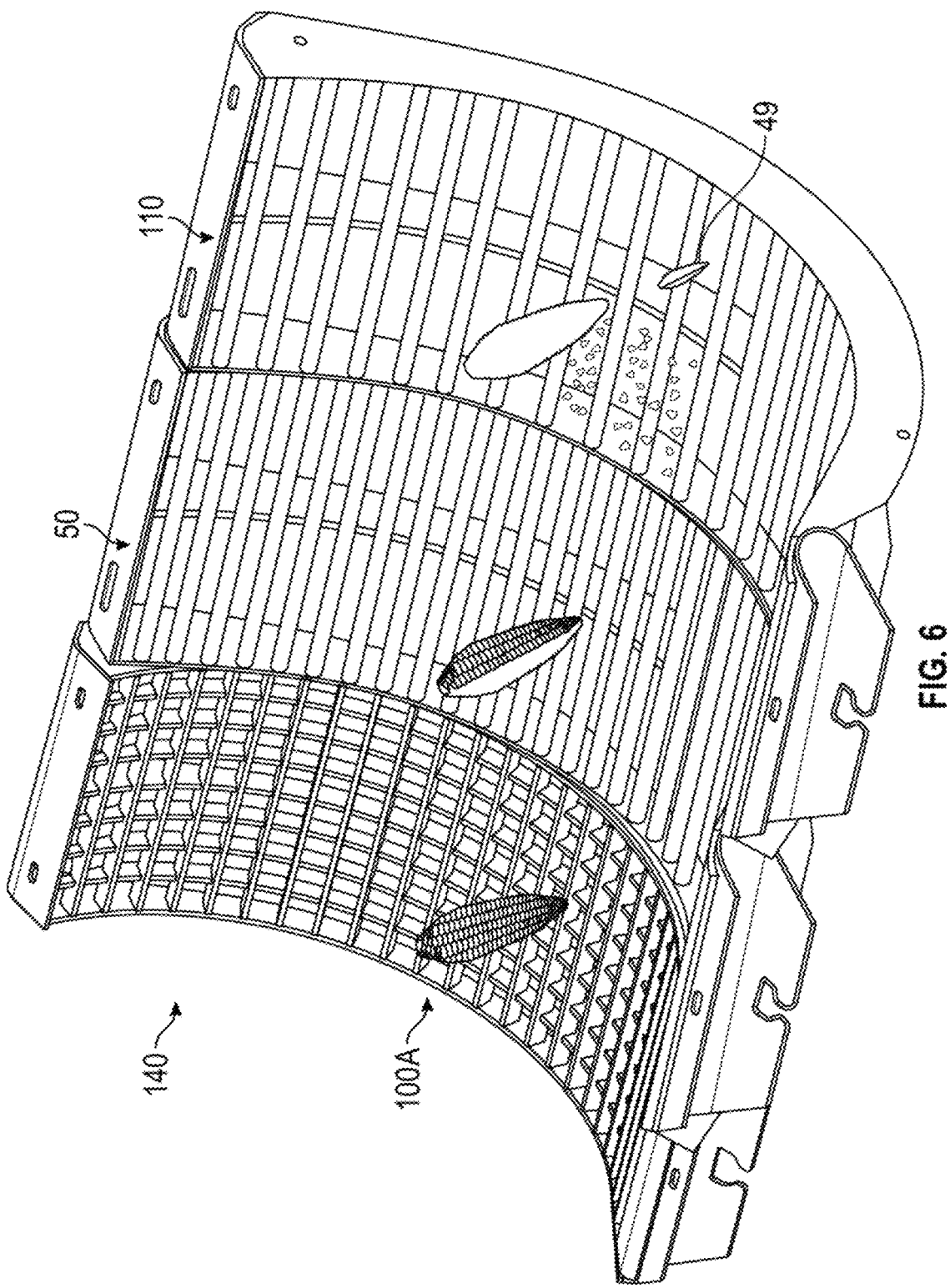
FIG. 6 shows a system adapted to harvest grain such as corn, said system relying on the use of distinct concaves depending on the concave position within the combine.

As shown in FIG. 6, the concave 140 in position #1 (also referred to as concave #1) includes the straight bar concave design shown in FIG. 7. The concave 140 is arranged in sequential combination with two round bar concaves 50, 110 shown in FIG. 4A and FIG. 5. The straight bar concave 140 of FIG. 7 with cover plates 132 installed presents a more aggressive and closed throat chamber, thereby retaining the harvest material for a longer period within the chamber to allow for additional threshing action by the rasp bars.

Figure 8:
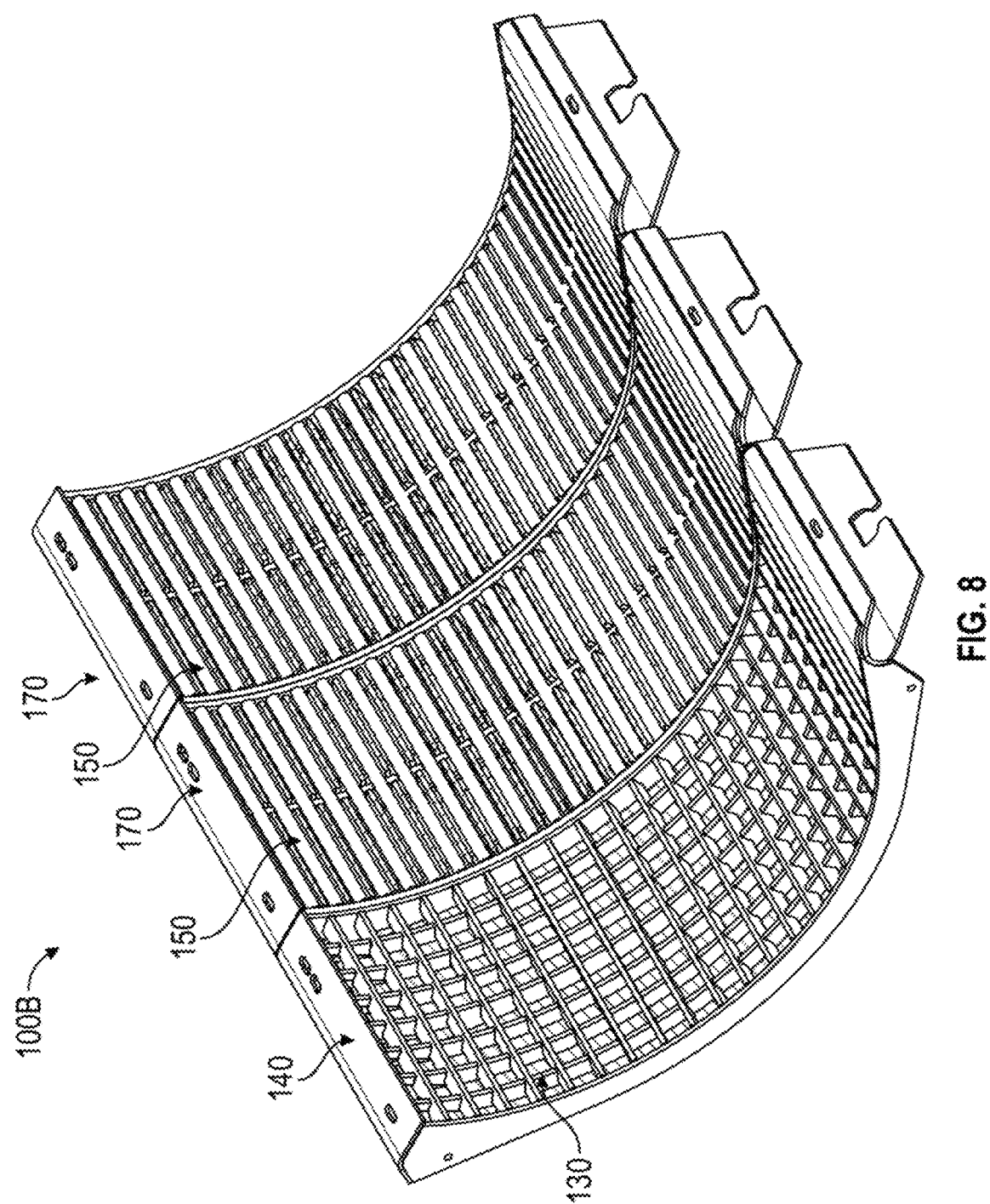
FIG. 8 shows a system adapted to harvest grain such as soybeans, said system relying on the use of distinct concaves depending on the concave position within the combine, cover plates attached to the modified concave of FIG. 7, and removable MOG limiting inserts removably attached to the round bar concaves.
Figure 9A:
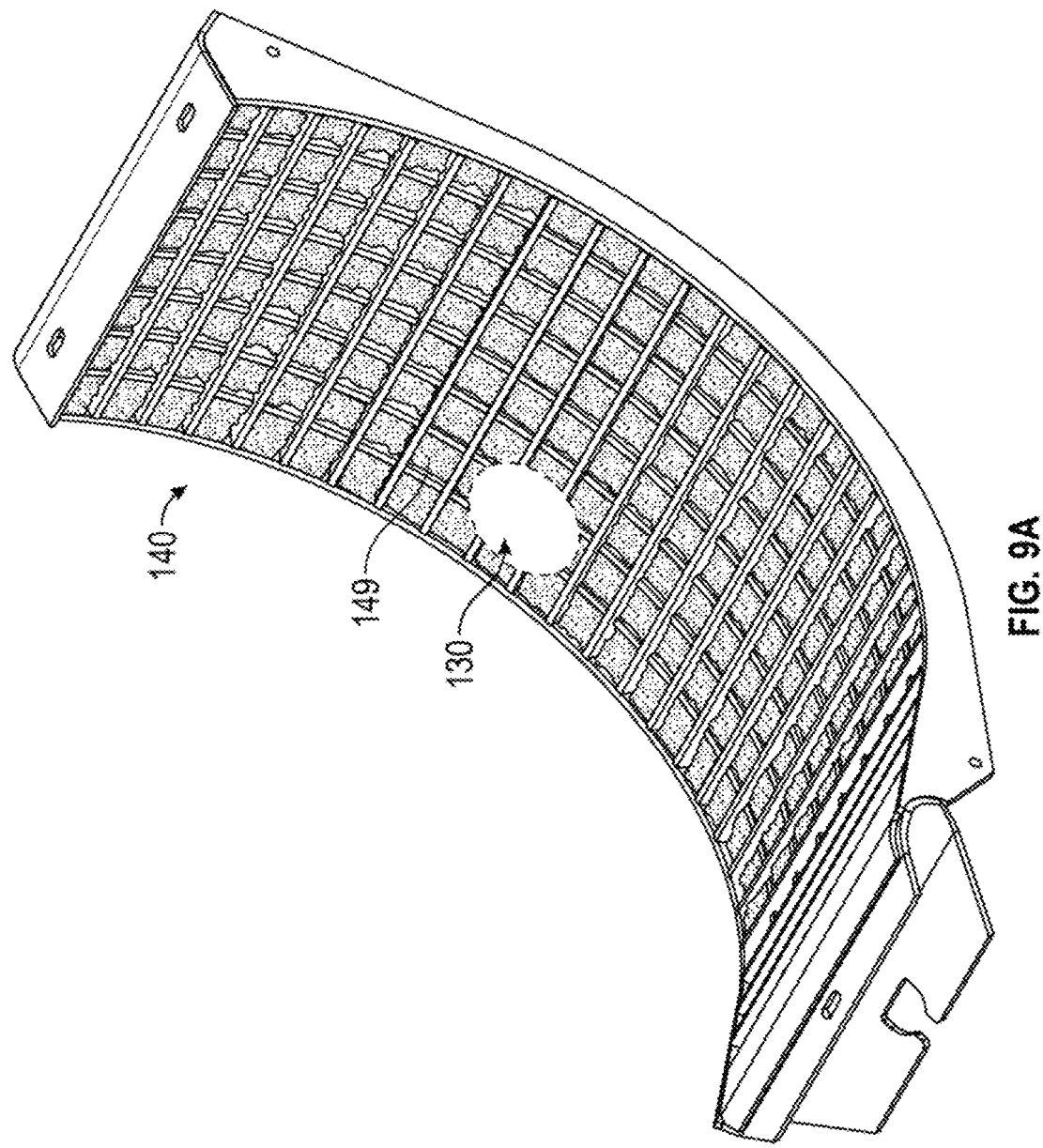
FIGS. 9A-9B detail a position #1 concave (e.g., the concave shown in FIG. 7) as assembled and employed within the system of FIG. 8. Each of FIGS. 9A-9B emphasize view of how the position #1 concave is attached to a cover plate included within the system of FIG. 8.
Figure 9B:
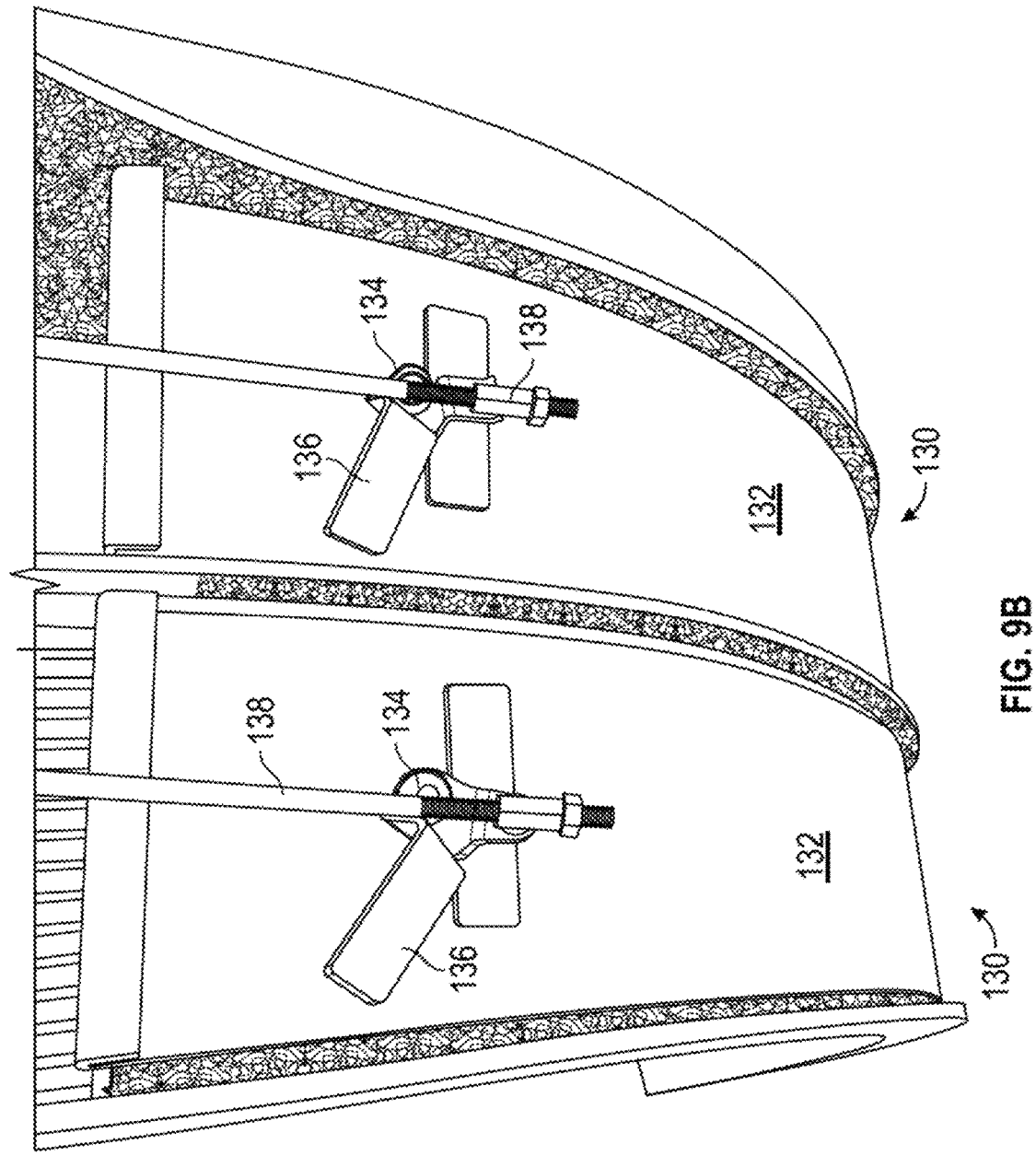
Figure 10:
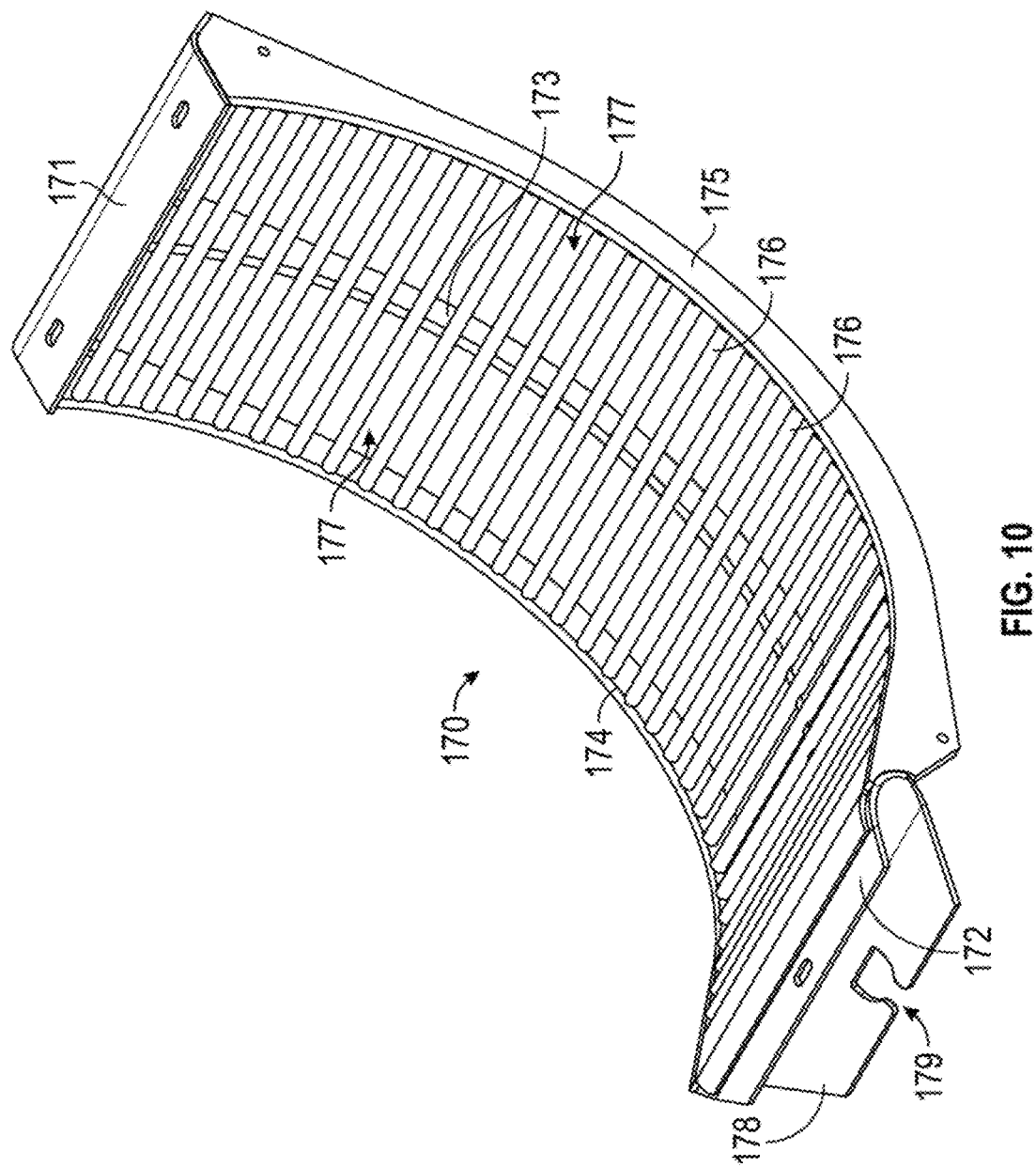
FIG. 10 details a round bar concave having a modified geometry specially adapted to increase flow rate of grain through the concave, according to some aspects of the present disclosure.

As shown in FIG. 8, the concave 140 is arranged in sequential combination with two round bar concaves 170 shown in FIG. 10. As shown in FIGS. 8 and 9A-9B, a cover plate assembly 130 is removably attached to the concave 140. The cover plate assembly 130 operates to retain pods or heads of soybeans for an extended period of time within the threshing chamber which facilitates the opening up and separation or removal of the small grain from its pod or head. The cover plate assembly 130 includes a plate body 132 that serves as the primary mechanism for preventing unthreshed heads and pods from passing through the straight bar concave 140 when employed within system 100B. FIG. 9A specifically shows that when the cover plate 130 is installed within the concave 140 with the modified geometry, MOG 149 will accumulate until absolutely no crop can be passed through the throat chambers 147. In such embodiments, the first concave 140 serves only to thresh material sent through the combine 10 for later separation by the concaves in subsequent positions.

The cover plate 130 can be secured to the straight bar concave 140 by way of a fastener 134 and tightening mechanism 136 that attach directly to the plate body 132, and a securing member 138 that attaches directly to the fastener 134 and either the top frame member 141 or the bottom frame member 142. The specific type of fasteners 134 and securement members 138 employed can be of the type shown in FIG. 9B, though it should also be appreciated generally that the fasteners 134 and securement members 138 screws, nuts, bolts, pins, rivets, staples, washers, grommets, latches (including pawls), ratchets, clamps, clasps, flanges, ties, adhesives, welds, any other known fastening mechanisms, or any combination thereof may be used to facilitate fastening. Moreover, the tightening mechanism 136, though shown as a rotatable handle, can be any suitable mechanism which easily helps the operator install and uninstall the cover plate assemblies 130. And depending on which fasteners 134 and securement members 138 are used, there will exist embodiments where no tightening mechanism 136 is necessary.

As shown in FIGS. 6, 8, 11A-B, and 11D, the #2 and #3 positions can be occupied with the improved replacement concaves 170 shown in FIG. 10. For the harvest of smaller grains, concaves 50 are utilized in positions #2 and #3. The kit therefore provides flow limiting/MOG limiting inserts 150 as shown in FIGS. 8, 9A-9B, and 11A-11D. The removable MOG limiting inserts 150 operate to restrict the passage of MOG 149 through the concave 50/170 and allow for the removal of some of the grain, pods, and heads while retaining MOG 149.

The small round concaves 170 generally has a top frame member 171, a bottom frame member 172, a center bar 173 (also known as a vertical frame member), a left side frame member 174, a right side frame member 175, horizontal round bars 176, side member 178, and attaching means 179. The frame forms a throat 177 through which separated grain passes. The small round bar concaves 170 can utilize a series of vertical wires passing through the horizontal bars 176. The round bar concave 170 of FIG. 10 features round cross bars 176 and is void of wires.

The horizontal round bars 176 differ from horizonal round bars 56, 116 in that these round bars are of a decreased size to allow for increased flow through the round bar concave 170. In some embodiments, these small round bar concaves can decrease the diameter of the round bars from five eighths inches (⅝ in.), see FIG. 5, to one half inches (½ in.), see FIGS. 4A and 10, or increase to three-quarters inches (¾ in.) (not shown). Hardened steel can form the leading edge of the round bars 176. Other embodiments could further reduce the diameter of the round bars, but durability may suffer in doing so. Yet other embodiments may further increase the diameter of the round bars, but at the expense of the total open area available to allow the grain to pass through the concave and out of the chamber 24. Hardened steel facilitates maintaining a durable edge which enhances continued use of the round bar concaves 170. The use of a sufficiently durable material can be critical where the diameter of the round bars is decreased so as to withstand the wear and tear of repeated forces over time or damage by rocks or the like compressed against the bars.

The openings 177 have been narrowed from the standardized ⅝ inches of the openings 57, see FIG. 4A, to a denser (more compact: narrower) ½ inches.

Figure 11A:
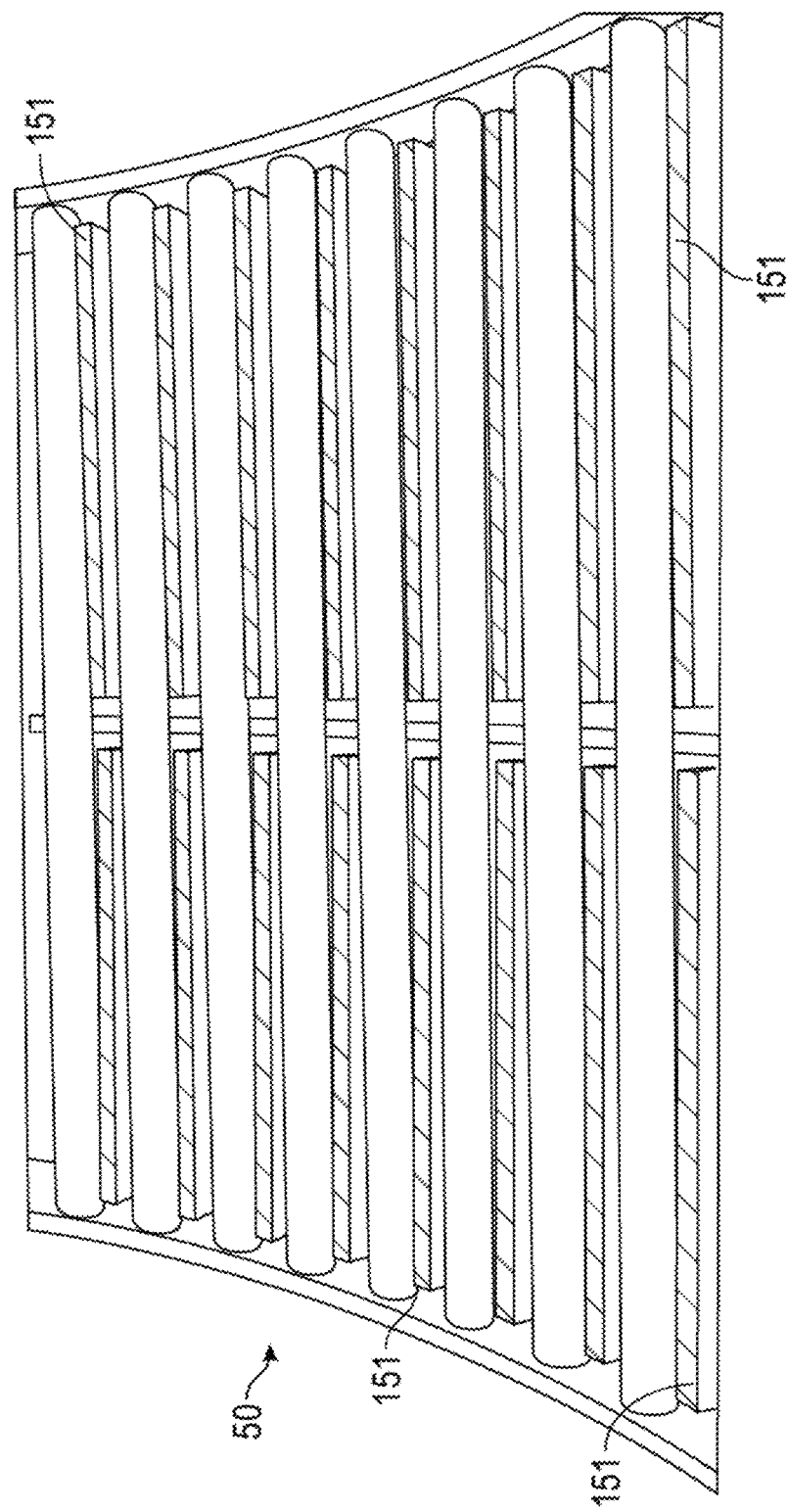
FIGS. 11A-11D detail position #2 and #3 concaves (e.g., the concave shown in FIG. 5) as assembled and employed within the system of FIG. 8. Each of FIGS. 11A-11C emphasize view of how the position #2/#3 concave is removably attached to a MOG limiting insert included within the system of FIG. 8.
Figure 11B:
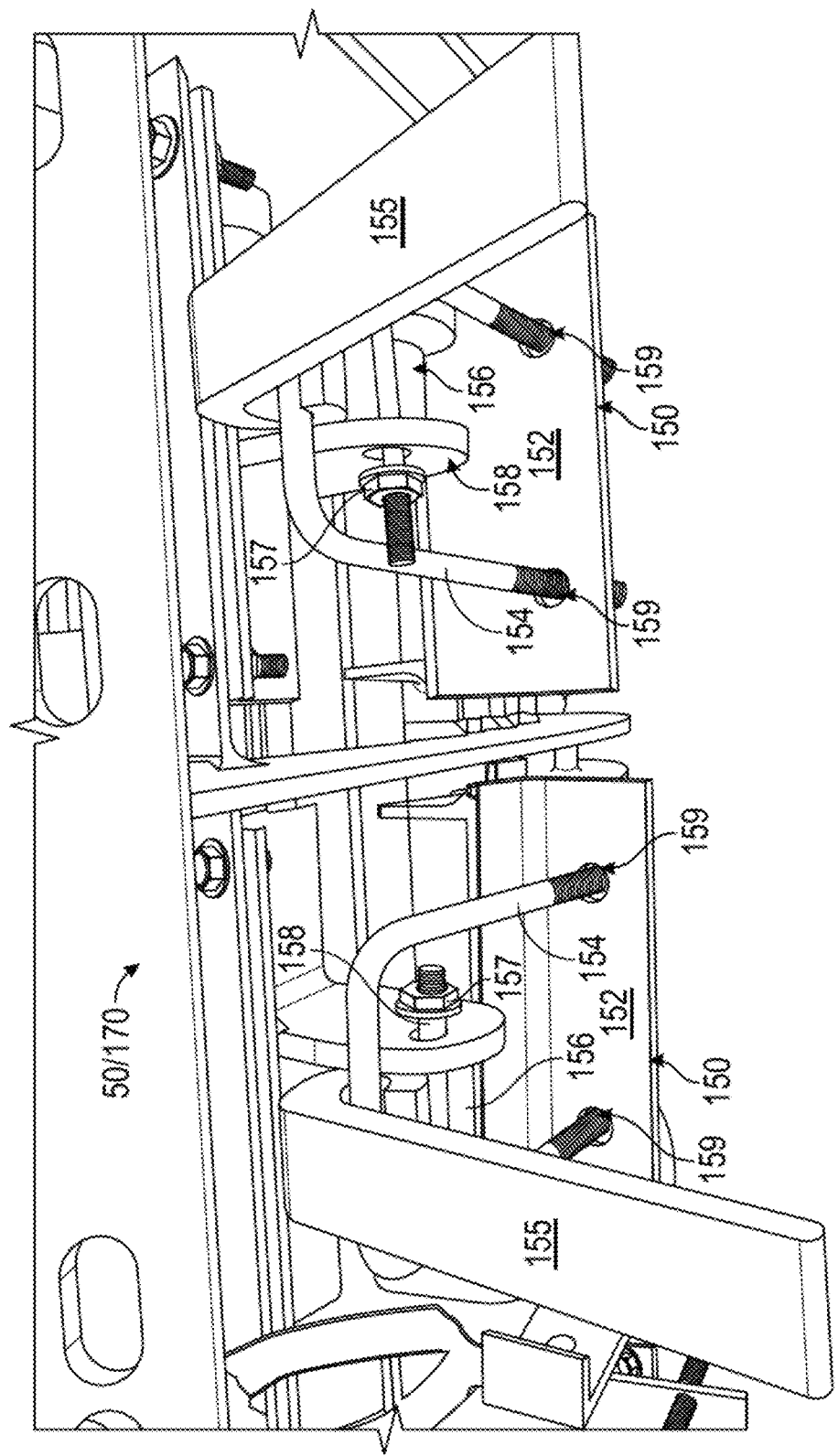
Figure 11C:
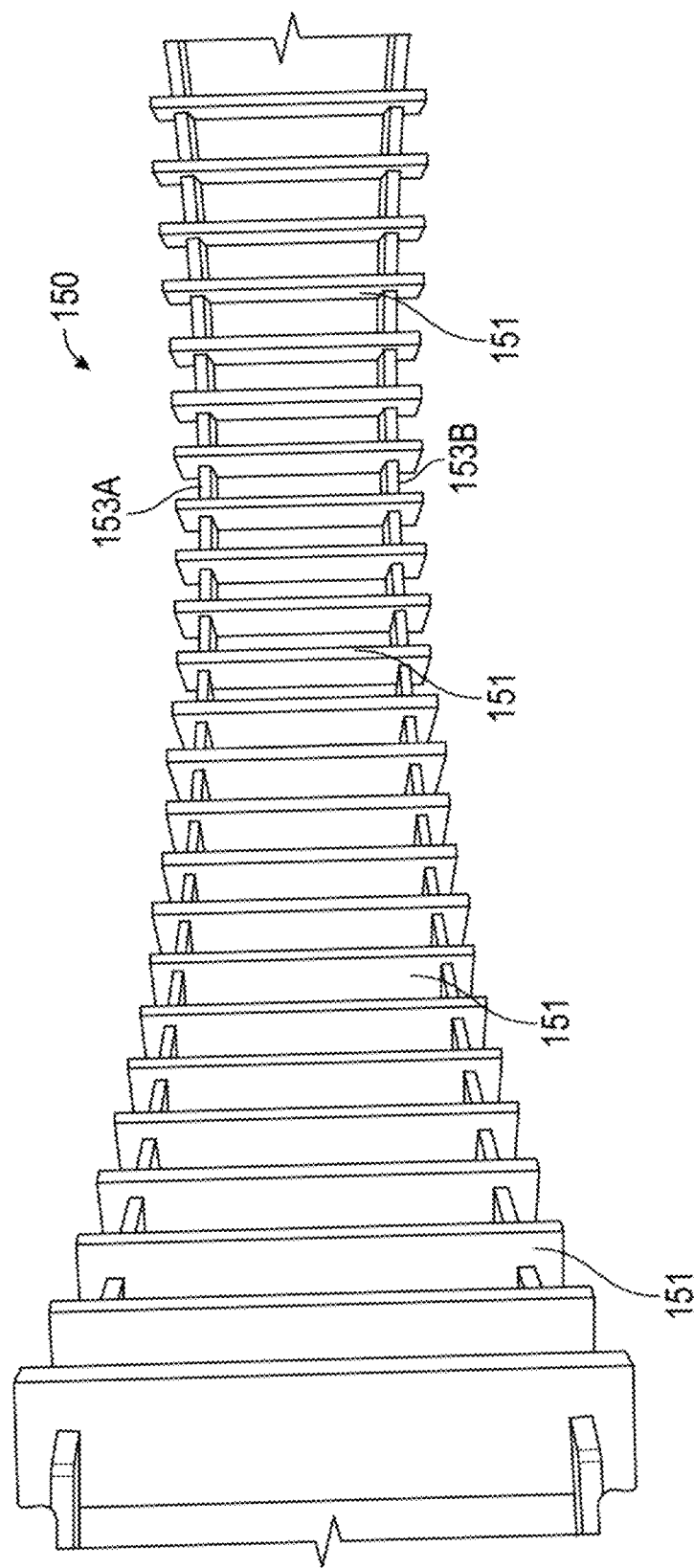

Each of the round bar concaves 50/170 can be installed with removable MOG limiting inserts 150 shown in FIG. 11C. The removable MOG limiting insert 150 utilizes inserts 151 that extend into and partially through the throats 57/177 of the round bar concaves 50/170. The inserts 151 thus help to decrease the size of the throats 57/177 and prevent thinner and smaller MOG, such as that associated with soybeans, from infiltrating and mixing with the harvested crop. In other words, the MOG limiting inserts 151 provide for a decreased opening designed to facilitate the flow of small grain out of the chamber but restrict flow of MOG 149 and retain MOG 149 within the chamber 24.

The round bar concave 50 can be fitted with removable MOG limiting inserts 150 which include inserts 151. There number of MOG limiting inserts 151 generally approximates the number of openings in the throat 57. These MOG limiting inserts 151 operate to reduce the openings thereby preventing MOG 149 from passing through the concave, as shown in FIGS. 8 and 11A-11D.

As shown in FIG. 11B, end members 152 of the removable MOG limiting inserts 150 are specially adapted to attached to the bottom and/or top frame members 51, 171, 52, 172 of the round bar concaves 50/170, such as by way of side members 58/178 and attaching means 59/179.

As shown, ends of a U-member 154 penetrate end member apertures 159 and can be secured to the end member 152 with use of nuts (not shown). The U-member 154 also rests within a hook 155. A combination of a central pin 156, nut 157, and apertures 158 located somewhere on the concaves 50/170. In the example shown, the apertures 158 are centrally positioned within arms that protrude from the concaves 50/170. These arms rest against and are positioned adjacent each side of the hooks 155. In other words, they can sandwich the hooks 155 in place so that the hooks do not move while the U-member 154 keeps the MOG limiting inserts 151 aligned in the appropriate positions within the throat 57/177.

Figure 11D:
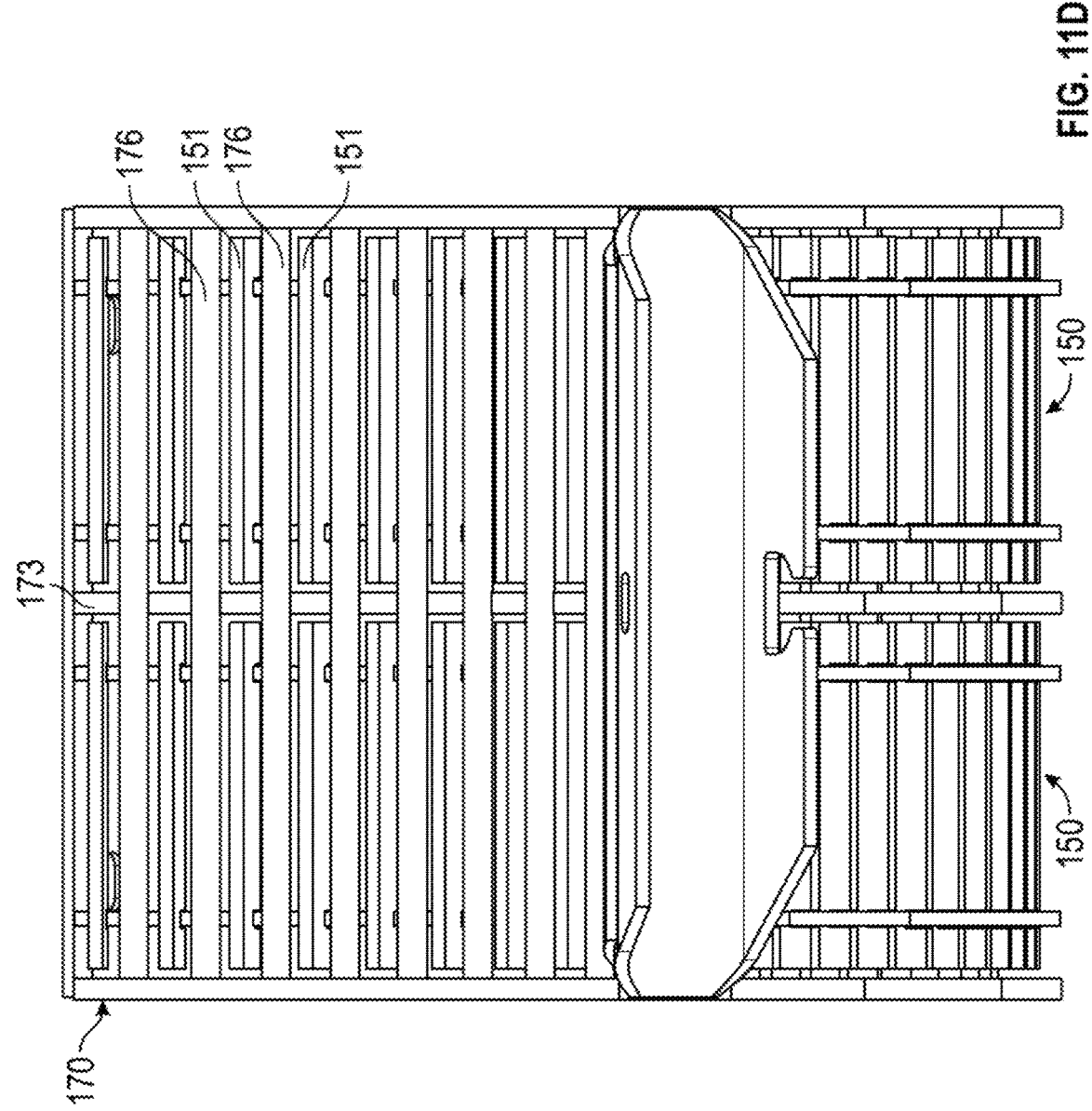
Figures 12E, 12F:
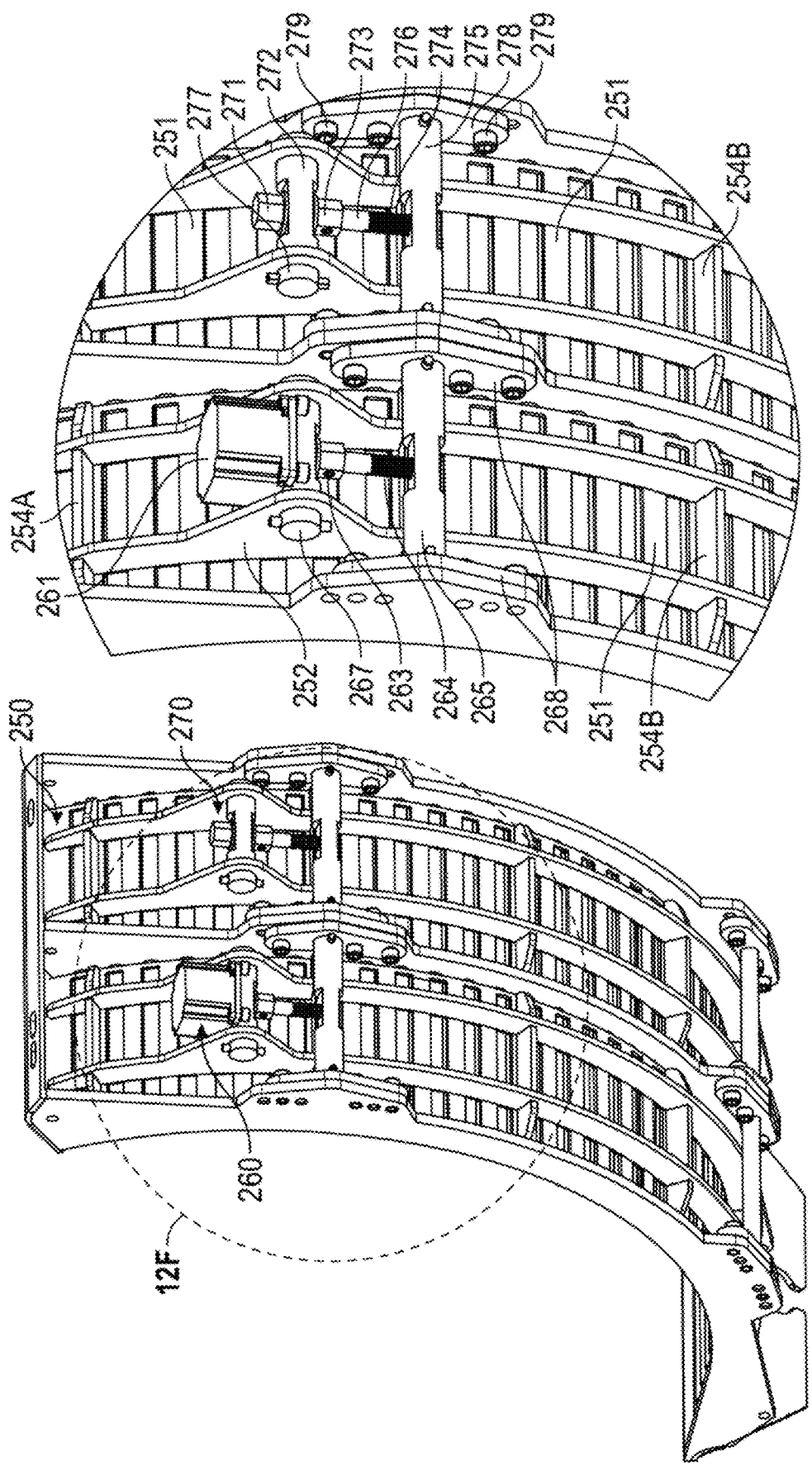

As shown in FIG. 11C, the inserts 151 are rectangular bars. The MOG limiting inserts 150 also includes parallel and opposite left- and right-side members 153A, 153B. The left- and right-side members 153A, 153B approximate the curve of the round bar concaves 50, 170 and terminate at end members 152. After installation, the rectangular bars 151 work to impede and prevent the flow of MOG through the openings 177, while still leaving enough room to allow grain to pass therethrough, as shown in FIG. 11D. The rectangular bars may therefore be sized to take up an amount of space that depends on the anticipated MOG size and/or crop that is being harvested. For example, the inserts 151 may limit space of the openings 177 to less than 75% of the size of the openings 177 without the inserts 151, alternatively less than 62.5% of the size of the openings 177 without the inserts 151, alternatively less than 50% of the size of the openings 177 without the inserts 151, alternatively less than 37.5% of the size of the openings 177 without the inserts 151, and alternatively less than 25% of the size of the openings 177 without the inserts 151.

FIGS. 12A-12H show adjustable MOG limiters 250 that can be used to selectively adjust the size of the openings 177 of a round bar concave. Similar to inserts 151, the limiting bars 251 are sized to limit space of the openings 177. The adjustable MOG limiters 250 also offer the benefit of being able to adjust the space of the gaps after installation. This allows the adjustable MOG limiters 250 to be easily used with a variety of crops without having to remove, install, and/or re-install the adjustable MOG limiters 250. Rather, the adjustable MOG limiters 250 need only to be installed once. For example, the adjustable MOG limiters 250 can be secured to a concave by way of securement apertures 257 and cross-pins that secure to both the adjustable MOG limiters 250 and the concaves.

Figure 13:
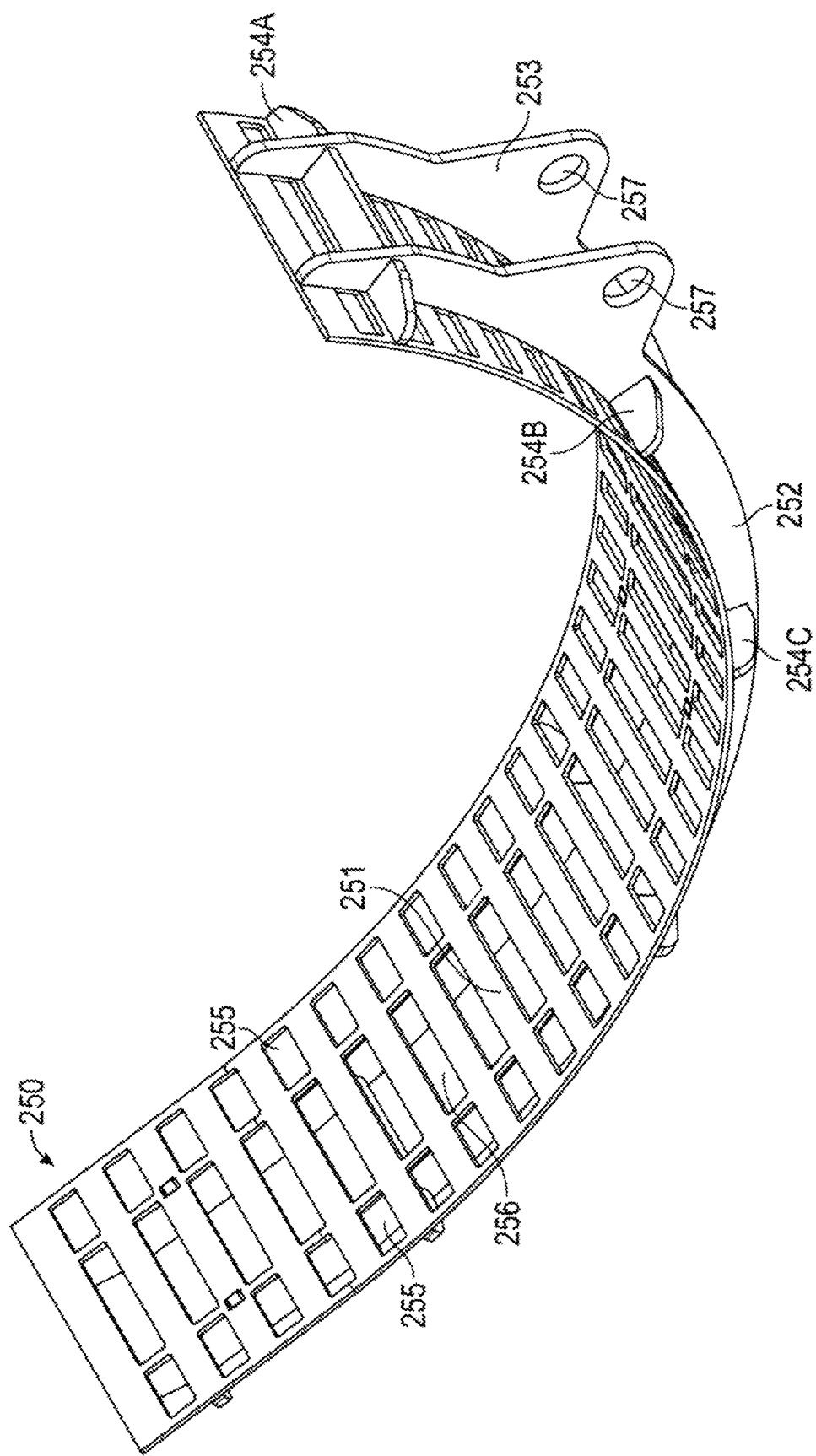
FIG. 13 shows an isolated, perspective view of the adjustable MOG limiter employed throughout FIGS. 12A-12H.
Figure 14A:
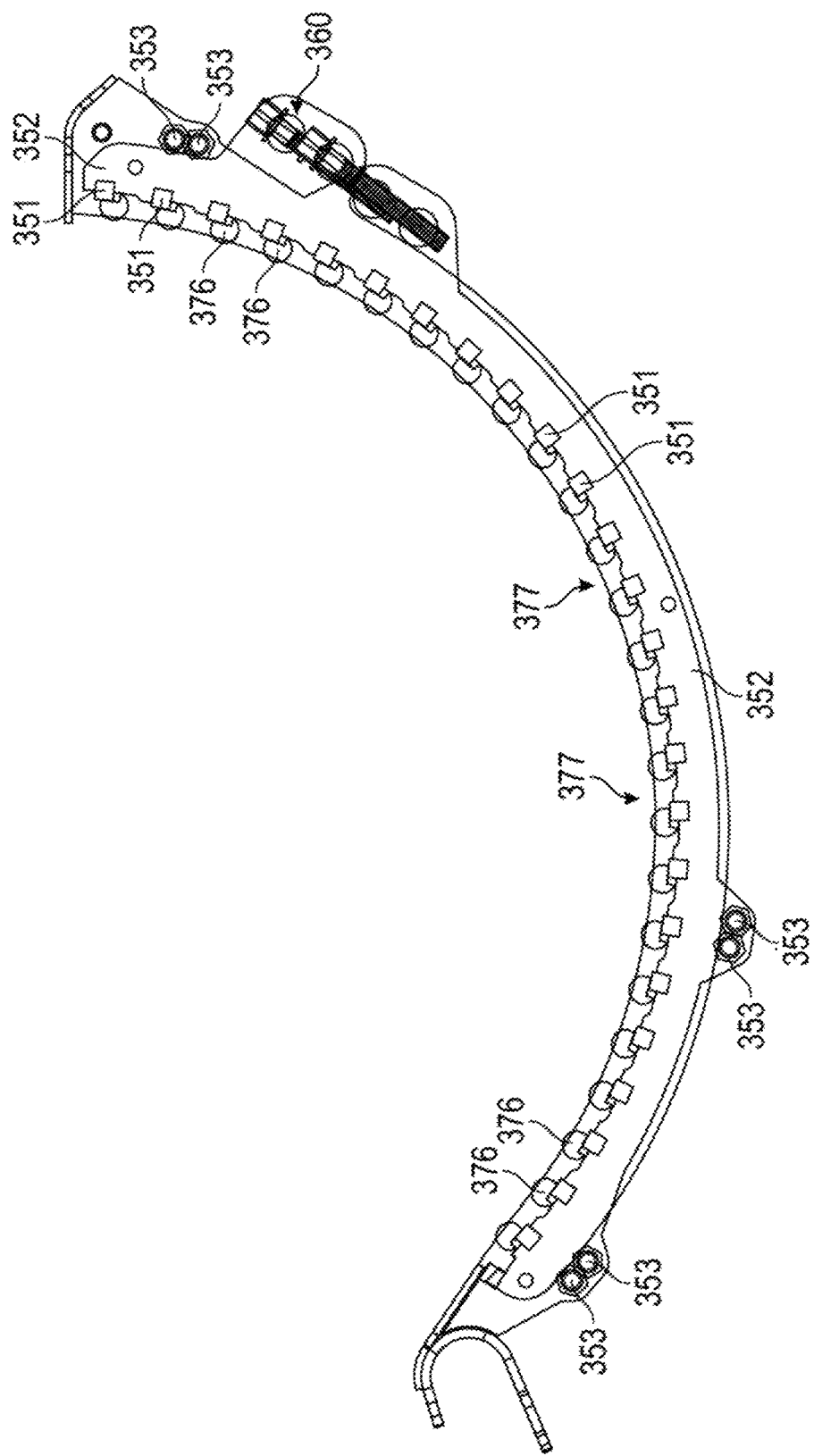
FIGS. 14A-G shows an alternative assembly with adjustable MOG limiters for the concaves of positions #2 and #3, wherein the adjustable MOG limiters can conceal or hide themselves within a notch on an underside of the round bars when the MOG limiters are in the fully retracted position. The MOG limiters are either manually or automatically adjusted while the concaves are in an operating position to open and close the gaps between the round bars.
Figure 14B:
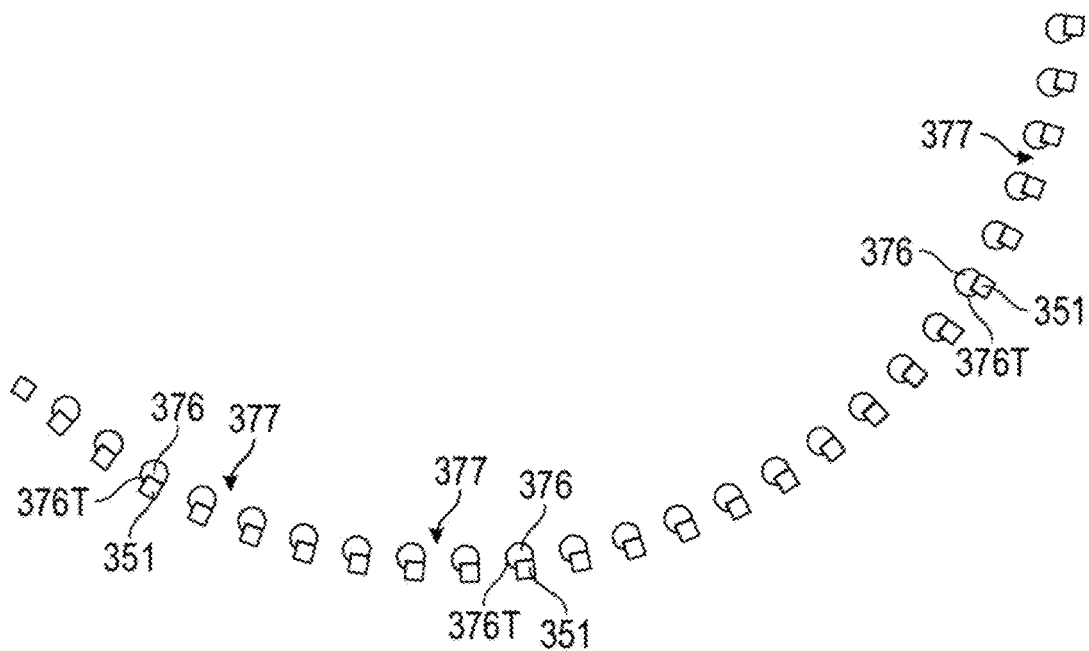
Figure 14C:
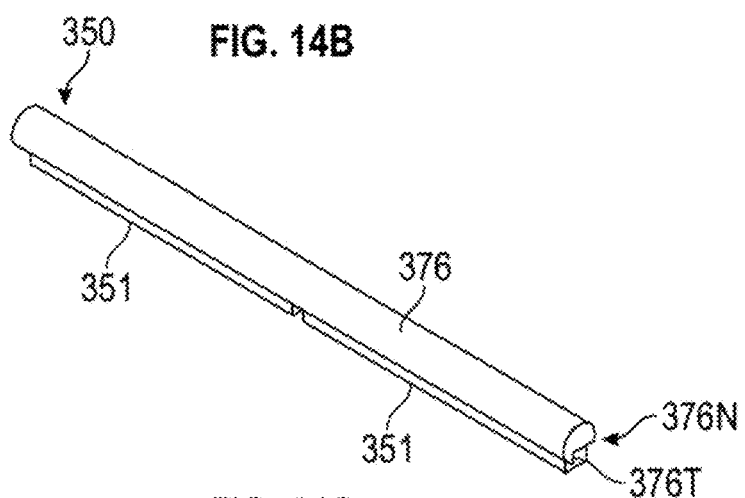
Figure 14D:
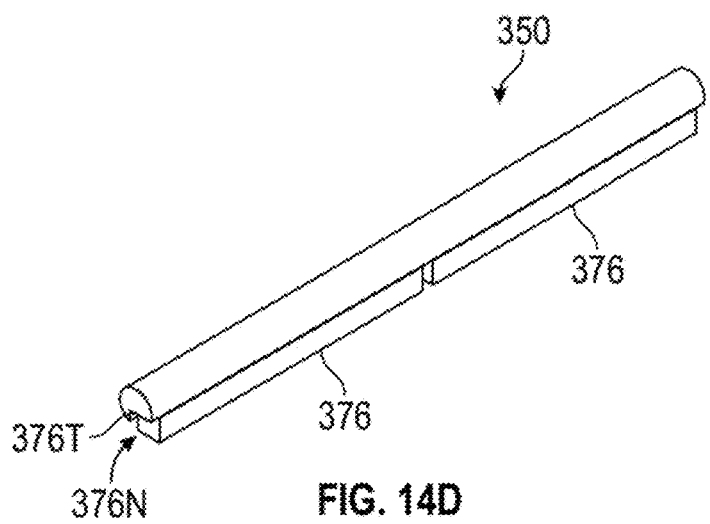
Figure 14E:
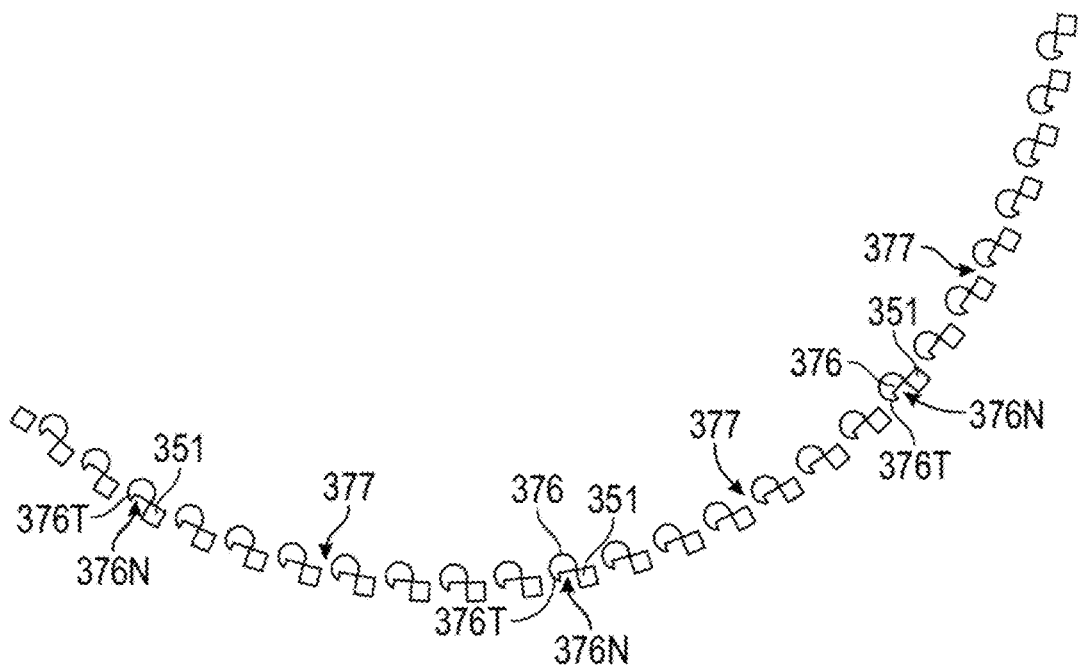
Figure 14F:
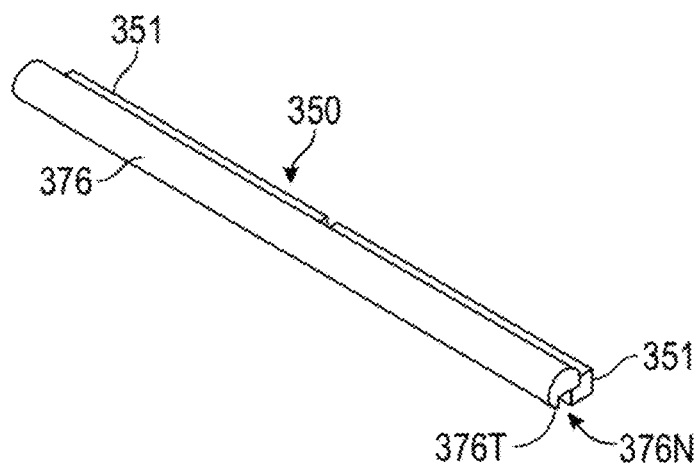
Figure 14G:
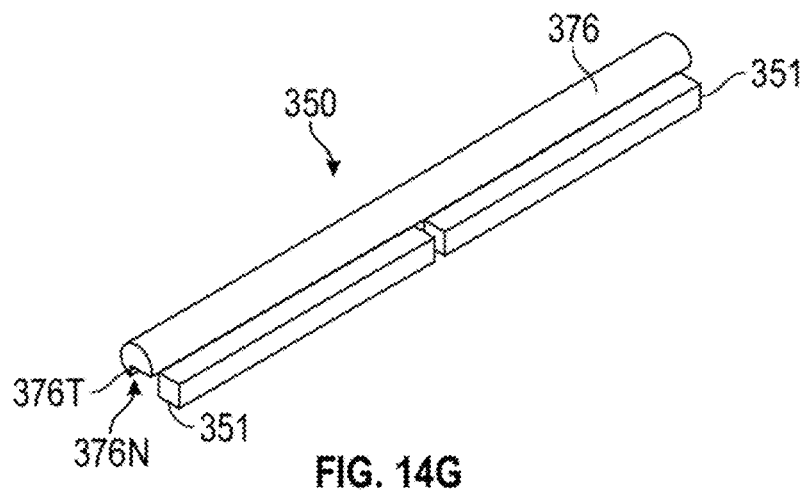

The limiting bars 251 shown is shown in isolation in FIG. 13. The limiting bars 251 are a series of rectangular plates. In this instance rectangular plates are used for ease of manufacturability. However, other shapes for plates can be used so long as the blades can block the flow of MOG in a deployed position and can allow for the maximum flow of grain in other positions. In the embodiment shown, the series of limiting bars 251 are held together by way of a left-side support plate 252 and a right-side support plate 253 that also act to brace the limiting bars 251 when impacted by MOG during the course of harvesting grain. Optionally, additional horizontal connectors 254A, 254B, 254C are shown to help further brace the limiting bars 251 from impact of MOG during the course of harvesting grain.

To allow for the selective flow of differing sizes of grain while limiting the passage of MOG, the adjustable MOG limiters 250 employ peripheral openings 255 and central openings 256 that can be actuated by an automated actuation assembly 260 and/or manual actuation assembly 270 between positions where the limiting bars 251 are concealed as much as possible (position 2600P; FIGS. 12A-D) behind the round bars to positions where the limiting bars 251 block as much of the gaps between the round bars (position 260CL; FIGS. 12E-H).

To move the adjustable MOG limiters 250 between positions, a bolt 266, 276 with threads 264, 274 can be rotated to increase and/or decrease a difference in relative position between round bars of the concaves and the limiting bars 251. A nut and/or washer 263, 273 can be employed to brace the bolt 266, 276 during rotation of same.

In the event manual actuation is desirable, a bolthead 271 can be rotated to adjust the relative position between round bars of the concaves and the limiting bars 251.

In the event automated actuation is desirable, a motor 261 can be employed to rotate the bolt 266 and thereby move the adjustable MOG limiters 250 between the positions 2600P, 260CL). For example, a closed loop-capable stepper motor can be used so as to merge the benefits of stepper and servo motor technology. The closed loop-capable stepper motor can run more smoothly and have a lower resonance than traditional stepper motors, provide position feedback and control, feature short settling times, and exhibit no step loss at all. The closed loop-capable stepper motor is an alternative to traditional stepper motors and can be particularly beneficial where energy efficiency, quiet running, and a high load tolerance are desired. Compared to servo motors, closed loop-capable stepper motors have advantages due to their high torque at low speeds, short settling times, correct positioning without back swing and a lower price for sizes that are often smaller.

The closed-loop method is also referred to as sine commutation via an encoder with field-oriented control. At the heart of closed-loop technology is the performance-adjusted current control as well as the feedback of the control signals. Using the encoder signals, the rotor orientation is recorded and sinusoidal phase currents are generated in the motor windings. Vector control of the magnetic field ensures that the magnetic field of the stator is perpendicular to that of the rotor within the motor 261 and that the field strength corresponds precisely to the desired torque. The current controlled in the windings provides a uniform motor force and results in an especially smooth-running motor that can be precisely regulated.

The actuation assemblies 260, 270 can secure to the adjustable MOG limiters 250 by way of a cross-pin 262, 272 that can be held in place by two threaded caps 267, 277. The actuation assemblies 260, 270 can secure to the concaves by way of a cross-pin 266, 276 that can be held in place by anchor plates 268, 278 and anchor points 269, 279 on both the anchor plates 268, 278 and the concaves.

In the embodiment shown in FIGS. 14A-G, keystock 351 acts as the adjustable component of the MOG limiters 350. The keystock 351 moves between a fully retracted position (hidden position: minimum blockage of MOG) and a fully deployed position (maximum blockage of MOG). The keystock 351 moves into and out of a notch 376N on the underside of the notched round bars 376 by way of actuation assembly 360.

A tail 376T creates a wall that mechanically prevents the keystock 351 from being actuated beyond the fully retracted position. A frame 352 attaches to each keystock 351 in the series of keystock 351. The frame 352 helps ensure that each of the keystock 351 properly lines up with each notched round bar 376 and all of the keystock 351 are in the same position and/or actuated by a single actuator in the actuation assembly 360.

Figure 15:
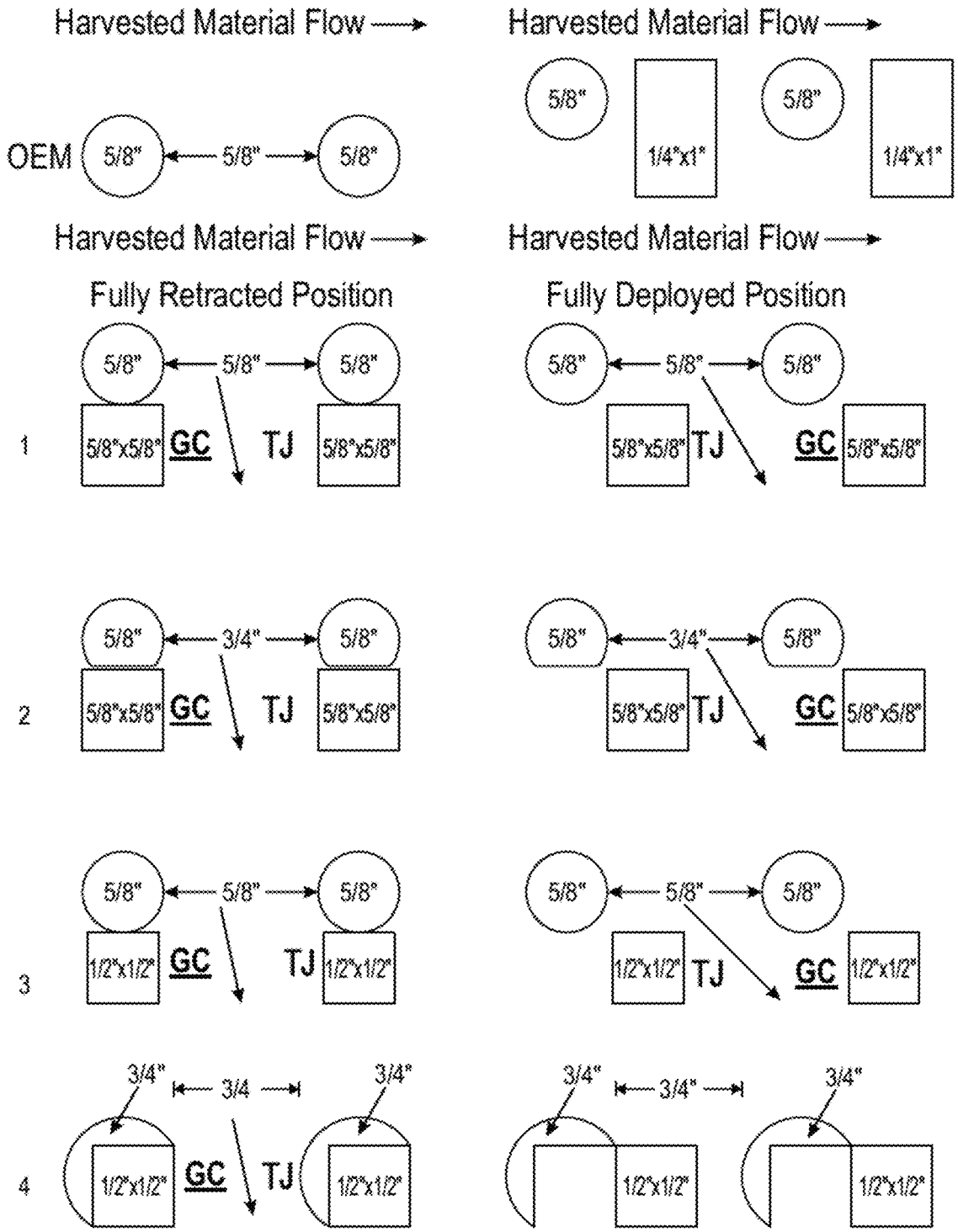
FIG. 15 shows, schematically, various cross sections of round bars of a concave adjacent the cross sections of MOG limiters that can be used with same. Each of the cross sections are shown in both an open position (corn) and a closed position (soybeans).

FIG. 15 shows, schematically, various cross sections of round bars of a concave adjacent the cross sections of MOG limiters that can be used with same. Each of the cross sections are shown in both a fully retracted position (which, in some instances of the present disclosure, is also referred to as an open position or a concealed position) and a (which, in some instances of the present disclosure, is also referred to as a closed position or an exposed position).

As shown in the first row of FIG. 15, to harvest corn, most OEM solutions utilize ⅛ inch round bars with ⅛ gaps. To harvest soybeans, removable inserts with a ¼-inch-wide by 1-inch-tall cross section can be installed whereby the tall sections insert within and functionally plug the openings between the round bars. The installation process to change from harvesting corn (left) to harvesting soybeans (right) takes substantial time and can be difficult due to the location of installation within the combine, because of the weight of the inserts, and/or due to the orientation of the tall sections vis-à-vis the openings between the round bars.

As shown in the middle three rows (labeled 1-3), and consistent with the embodiments shown in FIGS. 12A-H, adjustable MOG limiters 250 can be employed in concaves regardless of the size of the gaps of the concaves (i.e., ½ inch, ⅝ inch, ¾ inch, etc.) and regardless of the size of the round bars themselves (i.e., ½ inch, ⅝ inch, ¾ inch, etc.).

As shown in the last row (labeled 4), and consistent with the embodiments shown in FIGS. 14A-G, adjustable MOG limiters 350 can be employed to allow keystock 351 to be concealed in the fully retracted position and to impede the flow of harvested material in the fully deployed position.

As shown in FIG. 15, the grain channel GC is nearly or completely unimpeded by the limiting bars 251/keystock 351 when the adjustable MOG limiters 250, 350 are in the fully retracted position. The grain channel GC is partially impeded and/or almost fully impeded by the MOG limiting bars when the adjustable MOG limiters 250, 350 are in the fully deployed position. The actual trajectory TJ of the grain can depend on the rotors rotational speed, the velocity of grain being harvested and pushed through the threshing chamber (which in turn can depend on the ground speed of the combine in the field), the actual position of the MOG limiters 250, 350, and the clearance between the MOG limiters 250, 350 and the rotor 12. The actual trajectory TJ of grain through the openings of the concaves when the MOG limiters 250, 350 are in the fully deployed position is a larger angle from normal, due to the flow of grain being physically impeded by the limiting bars 251/keystock 351.

Figure 16:
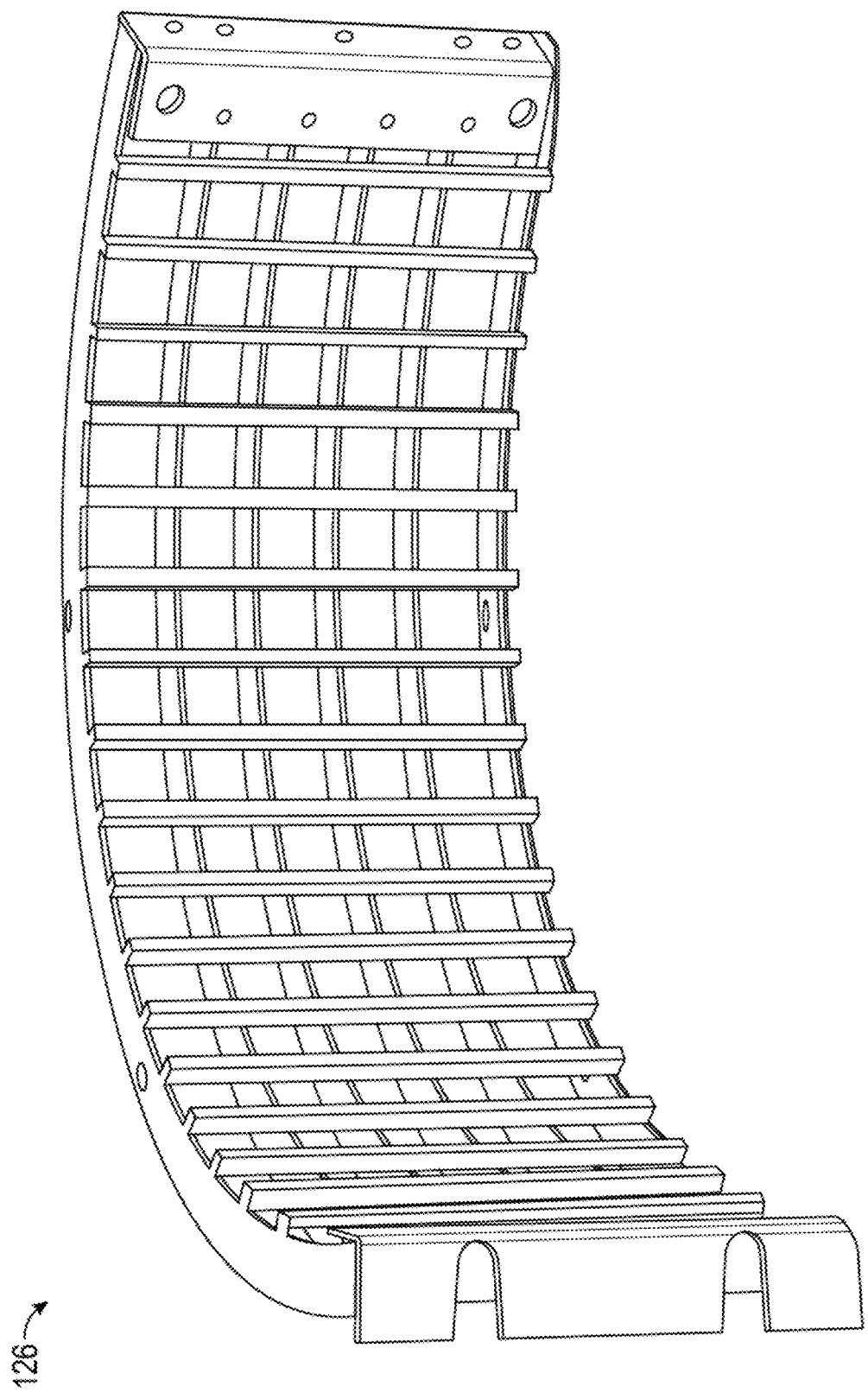
FIG. 16 shows a position #4, #5, and #6 separator grate for case.

FIG. 16 shows a separating grate 126 that are customarily positioned after the concaves within the chamber 24. The grates, customarily three positioned in series, are understood to present greater openings to allow the loose grain to fall out of the chamber. These grates customarily occupy positions #4, #5 and #6 in the chamber.

The kit utilizes an open valley configuration for the rasps 160, as shown in FIG. 7. Such a design allows the harvested material to be effectively directed downstream within the chamber 24 while abrading the material against the concaves. The open valleys/grooves 165 are located between ridges 164. The open valleys/grooves 165 provide channels for the grain to reside within and pass through thereby preventing it from being crushed between the top side of a body 161 of the valley rasp bar 160 and the front edge of the separation bars of the concave.

A leading edge 163 of the valley rasp bar include valleys 162 that correspond to the grooves 165. The corresponding valleys 162 are located such that they are positioned where the channel would be if extended all the way until the leading edge 163.

Figure 17:
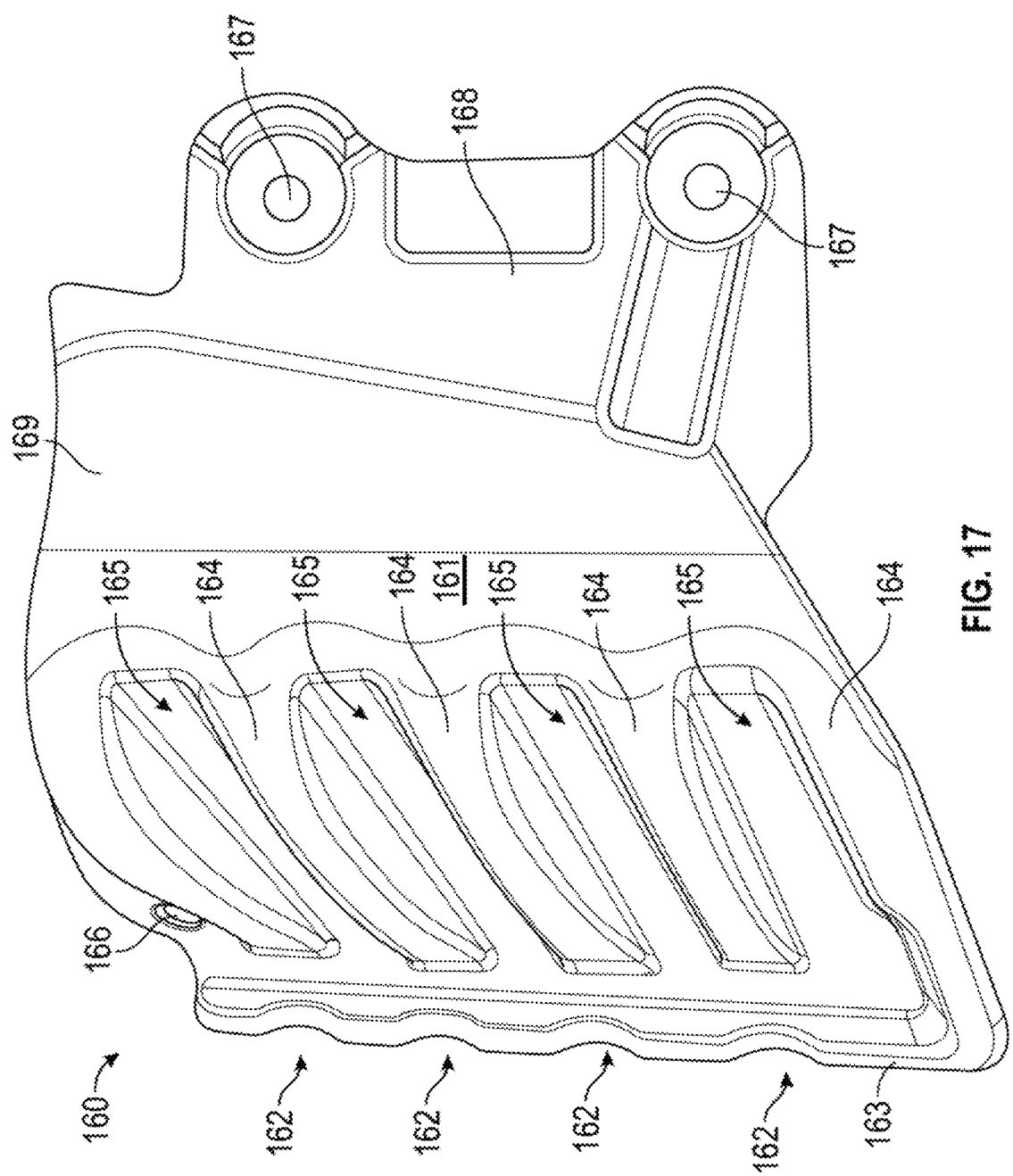
FIG. 17 details an improved rasp bar that includes grooves that correspond with valleys within a leading edge of rasp bar, according to some aspects of the present disclosure.

A main support aperture 166 can be utilized for mounting rasp bar to the rotor 12. In some embodiments, this aperture 166 can be placed toward the periphery of the body 161, such as that which is shown in FIG. 17. In still other embodiments, the main support aperture 166 can be included within a central location in the body 161. Fasteners such as bolts can be inserted into the main support aperture 166.

Secondary mounting apertures 167 help stabilize the mount of the rasp bar 160 to the rotor 12. The secondary mounting apertures 167 can be collinearly located with respect to one another within a mounting plate 168, however are preferably not collinear with the main support aperture 166 so as to minimize susceptibility to shear forces acting on the body 161 and to create a naturally more balanced system. A trailing edge 169 recesses backward and downward from the body 161 so as to attach the body 161 to a mounting plate 168 located more proximate to the rotor 12. The mounting plate 168 is thus usefully located to allow for use of shorter bolts for fastening the rasp bar 160 to the rotor 162. These shorter bolts will provide further support for withstanding any large moments from being created due to impact forces caused at a top edge of the body 161, without themselves being subject to the same types of large moments.

Figure 18:
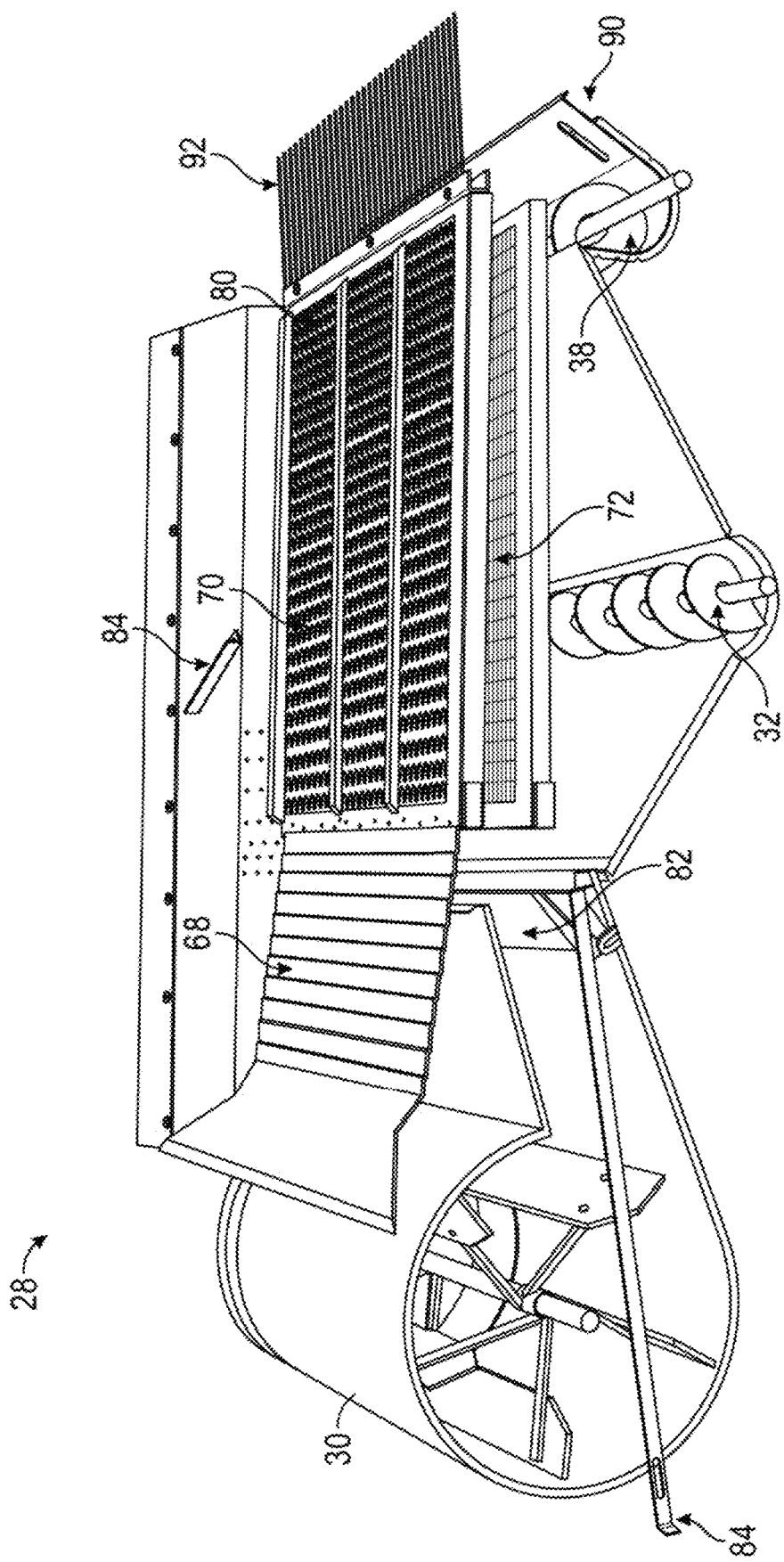
FIG. 18 exemplifies a cleaning system of a combine.
Figure 19:
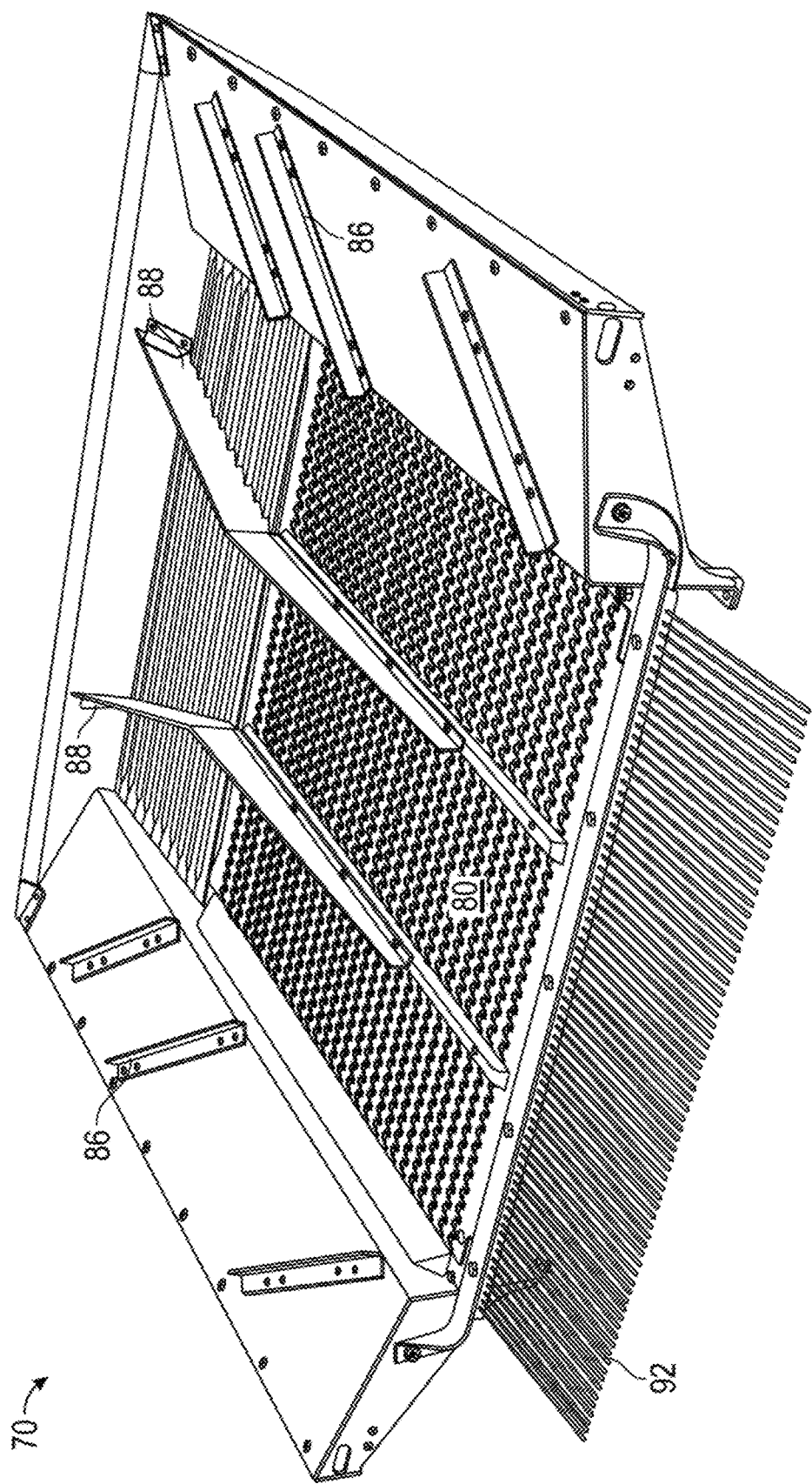
FIG. 19 exemplifies details a chaffer of the cleaning system shown in FIG. 18.

As shown in FIGS. 18-19, the final process in grain handling is cleaning. Cleaning is accomplished with a fan 30 and an adjustable chaffer 70. The adjustable chaffer 70 can be carried on live rubber bushings so as to reduce the effects of wear and tear on the combine 10 over time.

As shown in FIG. 19, the adjustable chaffer 70 includes a cleaning shoe sieve 72 and an chaffer extension 80. The grain and chaff are conveyed by the grain pan 68 to the adjustable chaffer 70 and chaffer extension 80. Rough cleaning occurs at the chaffer: the larger material passes over the adjustable chaffer 80 and tailings fingers 92 and out of the combine 10. Any unthreshed heads fall through the tailings fingers 92 and are returned for rethreshing. The grain and a minimum amount of small chaff fall through to the cleaning shoe sieve 72 where final cleaning takes place. The cleaning shoe sieve 72 can clean almost any crop if properly adjusted. The cleaning shoe sieve 72 can include round holes, elongated holes, rectangular holes, or any other suitably shaped hole depending on the crop being harvested.

The operation of the fan 30 creates constant airflow passing from front to back within the combine. Air from the fan 30 is directed toward the chaffer 80 and the cleaning shoe sieve 72 by the adjustable windboard. Increased air velocity, referred to as an air blast (blast) is generally caused and controlled by (1) the driven sheave on the fan shaft and (2) the valves at the ends of the fan housing. This blast blows away all material lighter than the grain. The fan 30 keeps the material "alive" and the blast of air is strong enough so that when combined with the shaking action of the sieves 72, the chaff is lifted slightly off of the sieves 72. It is to be appreciated some crops will need stronger blast than others in order to be moved over sieves 72.

The windboard 82 is adjustable to permit the proper placing of the blast on the chaffer 80 and the cleaning shoe sieve 72. The position to which the blast is directed on the adjustable chaffer 80 and the cleaning shoe sieve 72 is determined by adjusting the setting of the windboard 82 with a lever 84 located on the side of the combine 10 just to the front of the fan 30. The windboard adjusting lever 84 can be pushed to the rear to throw blast to the rear of the adjustable chaffer 70 and pulled to the front to throw blast to the front of the adjustable chaffer 70. The blast should be directed well to the front of the adjustable chaffer 70 when the adjustable chaffer 70 is heavily loaded, however, if the windboard 82 is tipped to throw the blast too far forward on the chaffer 70, there is risk of accumulation of grain at the rear end of the adjustable chaffer 70 which may be carried out of the combine 10.

Not all fields are perfectly flat. In sloped fields, the use of grain deflectors 86 on the side of the adjustable chaffer 70 and chaffer dividers 88 can help reduce banking of material to one side of the combine 10 and insure more even distribution on the adjustable chaffer 80.

The adjustable nature of the chaffer 80 controls the amount of material that falls through to the cleaning shoe sieve 72. The fingers 92 at the end of the chaffer 80 pass long straw and other MOG 49/149 out of the combine 10, but allow unthreshed heads to fall through to the return auger 38. Likewise, any material that has fallen through the adjustable chaffer 80 but is too large to pass through the cleaning shoe sieve 72, falls into the return auger 38 of the tailboard 90 and is returned to the threshing chamber 24 for further rethreshing.

The quantity of MOG 49/149 in the harvested crop can control the grade and market value of same. Weed seeds, dirt, and trash are thus preferably removed as soon as possible from the cleaning assembly 28.

It should be appreciated that where a straight bar concave is employed (e.g., in position #1), the rub bars and/or wires do not all have to be oriented at the same angle (i.e., oriented perpendicularly. For example, in the embodiment of the round bar concave 300 shown in FIG. 20, the angled straight bars 306 are angled to be perpendicular to the anticipated angle of harvested material. This means that toward the top portion of the frame 301, the straight bars are nearly horizontally oriented; and while toward the bottom portion of the frame 302, the straight bars are nearly vertically oriented. The angle becomes slightly more vertical throughout the series of angled round bars 306 as one moves from one round bar to the next, i.e. from the top portion of the frame 301, across the side members 308, and toward the bottom portion of the frame 302.

While the present disclosure has been described with respect to at least one embodiment, the embodiments described herein can be further modified within the spirit and scope of this disclosure. The present disclosure is therefore intended to cover any variations, uses, or adaptations of the invention using its general principles. Further, the present disclosure is intended to cover such departures from the present disclosure as come within known or customary practice in the art to which the present disclosure pertains and which fall within the limits of the appended claims.

EXAMPLES

Example 1: Static Grain Harvest Testing Between Calmer (Calmer Holding Company, LLC; Lynn Center, Illinois) Concaves and John Deere (Deere & Company; Moline, Illinois) Concaves Prototypes of the present invention were compared to the John Deere ("JD") Large Wire ("LW") Concave and the JD Round Bar ("RB") S680 and S780 STS™ Concaves.

For example, static testing of the unique concave design as compared to the John Deere OEM concave has shown up to a 60% increased flow rate of grain through the concave. Wet corn also flows better through Calmer concaves than John Deere Concaves.

TABLE 1

Flow Capacity of Concaves

| Concave Name | Dimensions of Concave Openings (in × in) | Number of Openings | Total Area of Concave Open Area (in$^2$) | Time 16.5 lb corn flows through concave(s) @ 12% moisture | Time 16.5 lb corns flows through concave(s) @ 25% moisture |
|---|---|---|---|---|---|
| 1$^{st}$ Prototype (FIG. 7 emb.) | 1.4 × 1.24 | 208 (26 × 8) | 361.1 | 4.65 | 10.7 |
| 2$^{nd}$ Prototype (FIG. 10 emb.) | 0.75 × 6.5 | 62 | 302.3 | 5.8 | 13.4 |
| JD Large Wire | 1.25 × .59 | 400 (25 × 16) | 295.0 | 10.6 | |
| JD OEM Round Bar (⅝") | 0.6 × 6.5 | 62 | 241.8 | 9.8 | |

TABLE 2

Static Testing of Dry Corn vs Wet Corn

| JD OEM RB with 5/8" gaps | Concave Open Area (COA) | Time to Flow 36 Pounds of Shell Corn at: (Flow Rate) | |
|---|---|---|---|
| | | 12% Moisture | 25% Moisture |
| JD RB | 242 in² | 9.8 sec. | 55 sec. |
| JD LW | 295 in² | 10.6 sec. | 42 sec. |
| FIG. 5 RB | 268 in² | 7.1 sec. | 18.1 sec. |
| FIG. 10 RB | 302 in² | 5.8 sec. | 13.4 sec |
| FIG. 7 RB | 361 in² | 5.2 sec. | 10.7 sec |
| JD Separating Grate ("SG") | 351 in² | | |
| FIG. 13 SG | 317 in² | | |

Example 2: Dry Field Grain Harvest Testing Between Calmer (Calmer Holding Company, LLC) Concaves, John Deere (Deere & Company) Concaves Results from Lab testing prototypes of the present invention were compared to results from Lab testing the JD Round Bar Concave and the JD Large Wire ("LW") OEM Concave compared by way of Tables 3, 5, 7, 9, 11, and 13. Additionally, the reduction of MOG ending up in the grain bin, as shown by comparing the results of Tables 4, 6, 8, 10, 12, and 14.

Field testing 32 mm concaves was conducted while running the rotor at 350 revolutions per minute (RPM). The results demonstrate that removing an increased amount of the grain early in the threshing operation, particularly in the #1 position, operates to enhance the efficiency of the grain separation and capture.

TABLE 3

Harvested Grain for John Deere Round Bar

| JD | RB #1 | RB #2 | RB #3 | Separating | Total |
|---|---|---|---|---|---|
| Section 1 | 4.2 | 2.3 | 1.7 | 13.2 | |
| Section 2 | 4.4 | 2.6 | 1.6 | | |
| Section 3 | 2.2 | 1.9 | 2.1 | | |
| Section 4 | 1.2 | 1.0 | 1.9 | | |
| Weight (lb) | 12.0 | 7.8 | 7.3 | 13.2 | 40.3 |
| % (nearest integer) | 30 | 19 | 18 | 33 | |

TABLE 4

MOG of Concaves for John Deere Round Bar

| # Ears | Whole | Broken | Split |
|---|---|---|---|
| 100 ears with 50 husks | 61 (61%) | 75 (39%) | 0 |

TABLE 5

Harvested Grain for JD Large Wire

| CASE | LW #1 | LW #2 | LW #3 | Separating | Total |
|---|---|---|---|---|---|
| Section 4 | 2.1 | 2.6 | 2.2 | 10.0 | |
| Section 3 | 4.0 | 5.1 | 2.4 | | |
| Section 2 | 6.3 | 4.1 | 2.0 | | |
| Section 1 | 4.4 | 2.9 | 1.7 | | |
| Weight (lb) | 16.8 | 14.7 | 8.3 | 10.0 | 49.8 |

TABLE 5-continued

Harvested Grain for JD Large Wire

| CASE | LW #1 | LW #2 | LW #3 | Separating | Total |
|---|---|---|---|---|---|
| % (nearest integer) | 34 | 30 | 17 | 20 | |

TABLE 6

MOG of Concaves for Case Large Wire

| # Ears | Whole | Broken | Split |
|---|---|---|---|
| 100 ears with 50 husks | 37 (37%) | 143 (63%) | 0 |

TABLE 7

Harvested Grain for Calmer Embodiment

| CALMER | FIG. 7 #1 | RB #2 | RB #3 | Separating | Total |
|---|---|---|---|---|---|
| Section 4 | 2.1 | 0.9 | 1.0 | 8.5 | |
| Section 3 | 2.9 | 1.5 | 0.8 | | |
| Section 2 | 4.9 | 1.7 | 1.2 | | |
| Section 1 | 4.5 | 1.3 | 1.3 | | |
| Weight (lb) | 14.4 | 5.4 | 4.3 | 8.5 | 32.6 |
| % (nearest integer) | 44 | 17 | 13 | 26 | |

TABLE 8

MOG of Concaves for Calmer Embodiment

| # Ears | Whole | Broken* | Split |
|---|---|---|---|
| 100 ears with 50 husks | 40 (40%) | 81 (60%) | 0 |

*There were three broken pieces found underneath under the Calmer embodiment.

TABLE 9

Harvested Grain for John Deere Round Bar

| JD | RB #1 | RB #2 | RB #3 | Sep. | Total |
|---|---|---|---|---|---|
| Section 4 | 1.3 | 0.9 | 1.3 | 13.8 | |
| Section 3 | 2.4 | 2.0 | 1.8 | | |
| Section 2 | 4.1 | 2.5 | 1.8 | | |
| Section 1 | 3.9 | 2.1 | 1.8 | | |
| Weight (lb) | 11.7 | 7.5 | 6.7 | 13.8 | 39.7* |
| % (nearest integer) | 30 | 19 | 17 | 35 | |

*45.8 lb in 44.7 lb recovered

TABLE 10

MOG of Concaves for John Deere Round Bar

| # Ears | Whole | Broken | Split |
|---|---|---|---|
| 100 with 75 husks | 58 (58%) | 75 (42%) | 0 |

TABLE 11

Harvested Grain for JD Large Wire

| CASE | LW #1 | LW #2 | LW #3 | Sep. | Total |
|---|---|---|---|---|---|
| Section 4 | 2.2 | 2.8 | 2.0 | 9.5 | |
| Section 3 | 3.6 | 4.9 | 2.5 | | |
| Section 2 | 5.3 | 3.8 | 1.8 | | |
| Section 1 | 4.2 | 2.5 | 1.7 | | |
| Weight (lb) | 15.3 | 14.0 | 8.0 | 9.5 | 46.8* |
| % (nearest integer) | 33 | 30 | 17 | 20 | |

*52.1 lb in 46.8 lb recovered

TABLE 12

MOG of Concaves for Case Large Wire

| # Ears | Whole | Broken | Split |
|---|---|---|---|
| 100 with 75 husks | 28 (28%) | 145 (72%) | 0 |

TABLE 13

Harvested Grain for Calmer Embodiment

| CALMER | FIG. 7 #1 | RB #2 | RB #3 | Sep. | Total |
|---|---|---|---|---|---|
| Section 4 | 2.9 | 1.0 | 1.1 | 12.0 | |
| Section 3 | 4.9 | 1.9 | 1.5 | | |
| Section 2 | 6.0 | 2.1 | 0.6 | | |
| Section 1 | 5.0 | 1.7 | 0.6 | | |
| Weight (lb) | 18.8 | 6.7 | 3.8 | 12.0 | 41.3* |
| % (nearest integer) | 46 | 16 | 9 | 29 | |

*50 lb in 45.3 lb recovered

TABLE 14

MOG of Concaves for Calmer Embodiment

| # Ears | Whole | Broken | Split |
|---|---|---|---|
| 100 with 75 husks | 37 (37%) | 138 (63%) | 0 |

Example 3: Wet Field Grain Harvest Testing Between Calmer (Calmer Holding Company, LLC) Concaves and John Deere (Deere & Company) Concaves, and Case (CNH Industrial) Concaves Results from field testing prototypes of the present invention in moist conditions were compared to results from field testing the JD Round Concave and the John Deere Large Wire ("LW") OEM Concave by way of Table 15.

The results demonstrate that Calmer embodiments are able to remove an increased amount of the grain early in the threshing operation, particularly in the #1 position, and this similarly operates to enhance the efficiency of the grain separation and capture.

TABLE 15

Percent of Grain Found in Each Chamber After Threshing 100 Ears of 14% Moisture Corn;

| JD OEM ⅝" RB with ⅝" gaps | RB #1 30% | RB #2 19% | RB #3 17.5% | Sep. 34% | Flow Capacity 726 in² |
|---|---|---|---|---|---|
| FIG. 7 + ⅝" RB | FIG. 7 #1 45% | FIG. 4A #2 17% | FIG. 4A #3 11% | Sep. 27% | Flow Capacity 845 in² |
| JD LW | LW #1 34% | LW #2 30% | LW #3 17% | Sep. 20% | Flow Capacity 885 in² |
| FIG. 7 + with ⅝" RB | FIG. 7 #1 45% | FIG. 5 #2 23% | FIG. 5 #3 13% | Sep. 19% | Flow Capacity 897 in² |
| FIG. 7 + ½" RB | FIG. 7 #1 44% | FIG. 10 #2 27% | FIG. 10 #3 15% | Sep. 14% | Flow Capacity 965 in² |

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 16

List of Reference Characters

| | |
|---|---|
| 1 | cab |
| 2 | corn head |
| 3 | maize |
| 4 | platform |
| 5 | reel arms |
| 6 | reel |
| 7 | tines |
| 8 | cutter bar |
| 9 | wheat/soybeans |
| 10 | combine |
| 11 | wheels |
| 12 | rotor |
| 13 | rotor casing |
| 14 | feeder house |
| 16 | undershot/slat chain conveying system |
| 18 | beater |
| 20 | infeed auger |
| 22 | nose |
| 24 | threshing chamber |
| 24A | concave in first position |
| 24B | concave in second position |
| 24C | concave in third position |
| 26 | separating area/separator grate assemblies |
| 26A | separating grate in fourth position |
| 26B | separating grate in fifth position |
| 26C | separating grate in sixth position |
| 26D | separating grate in seventh position |
| 28 | cleaning mechanism/cleaning assembly |
| 30 | blower |
| 32 | auger |
| 34 | storage bin |
| 36 | unloading spout |
| 38 | return auger |
| 40 | feeding spacer |
| 41 | top frame member |
| 42 | bottom frame member |
| 43 | straight vertical bars |
| 44 | left-side frame member |
| 45 | right-side frame member |
| 46 | horizontal straight bar |
| 47 | spaces |
| 48 | wires |
| 49 | material other than grain (MOG) |
| 50 | round bar concave with narrow gaps |

TABLE 16-continued

List of Reference Characters

| | |
|---|---|
| 51 | top frame member |
| 52 | bottom frame member |
| 53 | center bar |
| 54 | left-side frame member |
| 55 | right-side frame member |
| 56 | round bar |
| 57 | throat/openings |
| 58 | side member |
| 59 | attaching means |
| 62 | rasp bars |
| 64 | supports |
| 66 | helical kicker |
| 68 | grain pan |
| 70 | adjustable chaffer |
| 72 | cleaning shoe sieve |
| 80 | chaffer extension |
| 82 | windboard |
| 84 | lever |
| 86 | grain deflector |
| 88 | dividers |
| 90 | tailboard |
| 92 | fingers |
| 100A | corn threshing system |
| 100B | soybean threshing system |
| 110 | round bar concave with wide gaps |
| 111 | top frame member |
| 112 | bottom frame member |
| 113 | center bar |
| 114 | left-side frame member |
| 115 | right-side frame member |
| 116 | round bar |
| 117 | throat |
| 118 | side member |
| 119 | attaching means |
| 126 | separating grate |
| 130 | cover plate |
| 132 | plate body |
| 134 | fastener |
| 136 | tightening mechanism |
| 138 | securing member |
| 140 | modified concave |
| 141 | top frame member |
| 142 | bottom frame member |
| 143 | square edged vertical support bars |
| 144 | left-side frame member |
| 145 | right-side frame member |
| 146 | horizontal rub bar (straight bar) |
| 147 | throat |
| 148 | vertical support bar of reduced depth |
| 149 | material other than grain (MOG) |
| 150 | removable MOG limiting inserts |
| 151 | insert |
| 152 | end member |
| 153A | left side member |
| 153B | right side member |
| 154 | U-member |
| 155 | hook |
| 156 | central pin |
| 157 | nut |
| 158 | concave aperture |
| 159 | end member aperture |
| 160 | valley rasp bar |
| 161 | body |
| 162 | corresponding valley of leading edge |
| 163 | leading edge |
| 164 | ridge |
| 165 | valley |
| 166 | support aperture for mounting rasp bar to rotor |
| 167 | mounting apertures for mounting rasp bar to rotor |
| 168 | mounting plate |
| 169 | trailing edge |
| 170 | round bar concave |
| 171 | top frame member |
| 172 | bottom frame member |
| 173 | center bar |
| 174 | left-side frame member |
| 175 | right-side frame member |
| 176 | round bar |
| 177 | throat |
| 178 | side member |
| 179 | attaching means |
| 250 | adjustable MOG limiters |
| 251 | limiting bars |
| 252 | left-side support plate |
| 253 | right-side support plate |
| 254A, B, N | horizontal connectors |
| 255 | peripheral openings |
| 256 | central openings |
| 257 | securement apertures |
| 260 | automated actuation assembly |
| 260CL | fully deployed position |
| 260OP | fully retracted position |
| 261 | motor |
| 262 | cross-pin for actuation assembly |
| 263 | nut/washer |
| 264 | threads |
| 265 | cross-pin for anchor plates |
| 266 | bolt |
| 267 | cap for cross pin |
| 268 | anchor plate |
| 269 | anchor points |
| 270 | manually-driven actuation assembly |
| 271 | rotatable bolthead |
| 272 | cross-pin |
| 273 | nut/washer |
| 274 | threads |
| 275 | cross-pin for anchor plates |
| 276 | bolt |
| 277 | cap for cross pin |
| 278 | anchor plate |
| 279 | anchor points |
| 300 | concave with angled rub bars |
| 301 | top frame member |
| 302 | bottom frame member |
| 306 | angled straight bars (rub bars) |
| 308 | side member |
| 350 | concealable, adjustable MOG limiters |
| 351 | keystock |
| 352 | frame |
| 360 | actuation assembly |
| 376 | notched round bars |
| 376N | notch |
| 376T | tail |
| 377 | openings |
| GC | grain channel |
| TJ | trajectory |

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

Earlage is ensiled corn grain, cobs and, in some cases, husks and a portion of the stalk (depends on the harvest method). Earlage is higher in energy than corn silage with similar protein content, but it has lower energy than dry or high-moisture corn grain.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

What is claimed is:

1. A threshing and separation method to separate grains from material other than grain (MOG) via threshing and separating apparatuses comprising:
   passing grain through openings in a straight bar concave having straight bars with a rectangular cross-section;
   passing grain through openings in a plurality of round bar concaves each having round bars with an elliptical cross-section; and
   passing grain through openings in a plurality of separating grates;
   wherein the size of MOG progressively decreases as the grain and MOG pass through the sequence.

2. The method of claim 1, wherein the openings of the straight bar concave and the openings of the plurality of round bar concaves are correlated to an anticipated size of the MOG at each position.

3. The method of claim 1, wherein the straight bar concave has (i) one or more vertical support bars oriented at an angle to account for a velocity of the grain separated in threshing and (ii) horizontal rub bars perpendicularly oriented with respect to said vertical support bars.

4. The method of claim 3, wherein the horizontal rub bars are configured to cause a rebound effect where the grain is deflected upwardly and out of one or more straight bar throats of a threshing chamber.

5. The method of claim 3, wherein one or more of the vertical support bars may be angled at greater than 90° to present a slightly downwardly facing sidewall which would facilitate the grain striking the sidewall with velocity in being deflected downwardly through one or more of straight bar throats.

6. The method of claim 5, wherein the size of each of the straight bar throats is smaller than a size of first openings, and the size of the first openings is smaller than a size of second openings.

7. The method of claim 1, wherein the openings of subsequent threshing and separating apparatuses is equal to or less than the openings of any preceding threshing and separating apparatuses.

8. The method of claim 1, further comprising adjusting the openings of the threshing and separating apparatuses based upon an actual size of the MOG.

9. The method of claim 1, wherein a ratio of grain harvested by collecting threshed and separated grain through the openings in the straight bar concave and the plurality of round bar concaves over the grain harvested by collecting threshed and separated grain through the openings in the plurality of separating grates is between 3:1 and 6:1.

10. The method of claim 1, wherein the plurality of separating grates comprises two separating grates.

11. The method of claim 1, wherein the plurality of round bar concaves comprises two round bar concaves.

12. The method of claim 1, wherein the plurality of round bar concaves comprises a first round bar concave and a second round bar concave.

13. The method of claim 12, wherein the first round bar concave has a first plurality of round bars and a first center bar that contacts a midpoint of each of the first plurality of round bars, with first openings defined in spaces between the first plurality of round bars and the first center bar, and wherein the second round bar concave has a second plurality of round bars and a second center bar that contacts a midpoint of each of the second plurality of round bars, with second openings defined in spaces between the second plurality of round bars and the second center bar, the second openings.

14. The method of claim 1, wherein a threshing chamber comprises the threshing and separating apparatuses comprising the straight bar concave, the plurality of round bar concaves, and the plurality of separating grates.

15. The method of claim 14, wherein the threshing chamber further comprises removable MOG limiting inserts or adjustable MOG limiters that can adjust a concave open area of each of the plurality of round bar concaves.

16. The method of claim 14, wherein the threshing chamber further comprises a cover plate that is operably attached to and completely prevents grain from moving through at least one straight bar concave of the plurality of straight bar concaves.

17. The method of claim 1, wherein the threshing and separating apparatuses are operably attached to a combine.

18. The method of claim 17, wherein the combine harvests material and grains, wherein the harvested material comprises pods, ears, or heads, and wherein the grains comprise soybeans, corn, or wheat.

19. The method of claim 17, wherein the combine comprises a feeder house which delivers harvested material to the threshing and separating apparatuses via a conveying system and infeed auger.

20. The method of claim 1, further comprising blowing the grains and MOG out of a rear of the threshing and separating apparatuses.

* * * * *